(12) United States Patent
Warmus et al.

(10) Patent No.: US 6,446,100 B1
(45) Date of Patent: Sep. 3, 2002

(54) VARIABLE IMAGING USING AN ELECTRONIC PRESS

(75) Inventors: James L. Warmus, LaGrange; Mark G. Drey, Aurora, both of IL (US)

(73) Assignee: R.R. Donnelley & Sons Company, Chicago, IL (US)

( * ) Notice: Subject to any disclaimer, the term of this patent is extended or adjusted under 35 U.S.C. 154(b) by 172 days.

(21) Appl. No.: 09/599,799

(22) Filed: Jun. 22, 2000

Related U.S. Application Data

(63) Continuation of application No. 08/478,397, filed on Jun. 7, 1995, now Pat. No. 6,327,599.

(51) Int. Cl.[7] .............................................. G06F 17/21
(52) U.S. Cl. ...................... 707/517; 707/520; 707/522
(58) Field of Search ................................ 707/517, 515, 707/520, 522, 505, 511, 512, 513, 514, 525, 530, 539

(56) References Cited

U.S. PATENT DOCUMENTS

| | | | |
|---|---|---|---|
| 3,872,460 A | 3/1975 | Fredrickson et al. .. | 340/324 AD |
| 3,899,165 A | 8/1975 | Abram et al. ................. | 270/54 |
| 4,095,780 A | 6/1978 | Gaspar et al. ................ | 270/73 |
| 4,121,818 A | 10/1978 | Riley et al. ................... | 270/54 |
| 4,395,031 A | 7/1983 | Gruber et al. ................ | 270/54 |
| 4,426,072 A | 1/1984 | Cole et al. .................... | 270/53 |
| 4,495,582 A | 1/1985 | Dessert et al. .............. | 364/469 |
| 4,500,083 A | 2/1985 | Wong .......................... | 270/54 |
| 4,536,176 A | 8/1985 | Gaspar ....................... | 493/365 |
| 4,554,044 A | 11/1985 | Gaspar et al. ............... | 156/510 |
| 4,601,003 A | 7/1986 | Yoneyama et al. ......... | 364/518 |
| 4,672,462 A | 6/1987 | Yamada ...................... | 358/280 |
| 4,674,052 A | 6/1987 | Wong et al. ................. | 364/466 |
| 4,718,784 A | 1/1988 | Drisko ......................... | 400/68 |
| 4,727,402 A | 2/1988 | Smith ..................... | 355/14 SH |
| 4,729,037 A | 3/1988 | Doelves ...................... | 355/299 |
| RE32,690 E | 6/1988 | Wong .......................... | 270/54 |
| 4,768,766 A | 9/1988 | Berger et al. ................. | 270/58 |
| 4,789,147 A | 12/1988 | Berger et al. ................ | 270/1.1 |
| 4,827,315 A | 5/1989 | Woldberg et al. ........... | 346/160 |
| 4,900,001 A | 2/1990 | Lapeyre ...................... | 270/1.1 |
| 4,903,139 A | 2/1990 | Minter ........................ | 358/296 |
| 4,910,612 A | 3/1990 | Yamazaki ................... | 358/496 |
| 4,928,252 A | 5/1990 | Gabbe et al. ................ | 364/519 |
| 4,937,761 A | 6/1990 | Hassett ....................... | 364/518 |

(List continued on next page.)

FOREIGN PATENT DOCUMENTS

| | | |
|---|---|---|
| EP | 0 602 547 A2 | 6/1994 |
| EP | 0 703 524 A1 | 3/1996 |
| EP | 0 703 524 B1 | 1/1997 |
| WO | PCT/US86/00242 | 8/1986 |
| WO | WO 95/07510 | 3/1995 |

OTHER PUBLICATIONS

Scitex brochure: "SX3000/40 Digital Front End: A Powerful Color Print Server for the Xerox DocuColor 40" (undated).
Scitex brochure: "SX3000/70 Digital Front End: A Powerful Color Print Server for the Xerox DocuColor 70" (undated).
Scitex brochure: "Scitex Xerox Success Stories: CAD Graphics, Chicago, Illinois" (Jul. 1998).

(List continued on next page.)

Primary Examiner—Stephen S. Hong
(74) Attorney, Agent, or Firm—Marshall, Gerstein & Borun

(57) ABSTRACT

An apparatus and method for controlling an electronic press develops first and second sets of template data representing associated first and second template pages, respectively, wherein each set of template data includes master data representing fixed information to be printed and area data representing an area of a page in which variable information is to be printed. A database is developed having a number of entries, each of which represents variable printed information and an electronic press is responsive to the sets of template data and the database to print the first and second template pages with selected variable printed information.

36 Claims, 19 Drawing Sheets

U.S. PATENT DOCUMENTS

| | | | |
|---|---|---|---|
| 4,968,993 A | 11/1990 | Wolfberg et al. | 346/160 |
| 5,001,500 A | 3/1991 | Wolfberg et al. | 346/160 |
| 5,021,975 A | 6/1991 | Yamanashi | 364/519 |
| 5,043,749 A | 8/1991 | Punater et al. | 346/153.1 |
| 5,067,024 A | 11/1991 | Anzai | 358/296 |
| 5,105,283 A | 4/1992 | Forest et al. | 358/401 |
| 5,112,179 A | 5/1992 | Chan et al. | 412/1 |
| 5,136,316 A | 8/1992 | Punater et al. | 346/153.1 |
| 5,142,667 A | 8/1992 | Dimperio et al. | 395/115 |
| 5,144,562 A | 9/1992 | Stikkelorum et al. | 364/478 |
| 5,177,877 A | 1/1993 | Duchesne et al. | 34/51 |
| 5,178,063 A | 1/1993 | Wolfberg et al. | 101/76 |
| 5,194,899 A | 3/1993 | Buchanan | 355/244 |
| 5,245,701 A | 9/1993 | Matsumoto | 395/129 |
| 5,267,155 A | 11/1993 | Buchanan et al. | 395/803 |
| 5,271,065 A | 12/1993 | Rourke et al. | 382/1 |
| 5,274,567 A | 12/1993 | Kallin et al. | 364/478 |
| 5,274,757 A | 12/1993 | Miyoski et al. | 395/146 |
| 5,289,569 A | 2/1994 | Taniguchi | 395/787 |
| 5,353,222 A | 10/1994 | Takise et al. | 395/793 |
| 5,379,373 A | 1/1995 | Hayashi et al. | 395/774 |
| 5,384,886 A | 1/1995 | Rourke | 395/785 |
| 5,396,321 A | 3/1995 | McFarland et al. | 355/313 |
| 5,398,289 A | 3/1995 | Rourke et al. | 382/1 |
| 5,412,566 A | 5/1995 | Sawa | 395/803 |
| 5,459,826 A | 10/1995 | Archibald | 395/779 |
| 5,493,490 A | 2/1996 | Johnson | 395/226 |
| 5,594,860 A | 1/1997 | Gauthier | 395/501 |
| 5,630,028 A | 5/1997 | DeMeo | 395/110 |
| 5,729,665 A | 3/1998 | Gauthier | 395/117 |
| 5,963,968 A * | 10/1999 | Warmus et al. | 707/517 |
| 6,246,993 B1 * | 6/2001 | Dreyer et al. | 705/9 |
| 6,327,599 B1 * | 12/2001 | Warmus et al. | 707/517 |
| 6,332,149 B1 * | 12/2001 | Warmus et al. | 707/517 |

OTHER PUBLICATIONS

Scitex brochure: "Scitex Xerox Success Stories: DW Graphics, Stockton, CA" (Jul. 1998).

Xerox brochure: "think color: Xerox DocuColor 70" (1998).

Xerox brochure: "New Generation Fiery Technology for the Xerox DocuColor 70 Digital Color Press: Fiery ZX–70" (1998).

Xerox brochure: World–class prepress performance for the Xerox DocuColor 70 Digital Color Press: Scitex SX3000T (1998).

Xerox brochure: "Xerox VIPP—the fastest, most reliable method to reach your customers individually . . . all at the same time" (1998).

Xerox brochure: "BOOM!—The Explosion is in Short–run Digital Color Printing" (1998).

Varis Corporation Internet Website: "Varis Corporation Unveils Unprecedented Products for Variable Print–On–Demand Market," URL:www.variscorp.com/ns/ns.pro.html#pr (Nov. 2, 1998).

BARCO Graphics/IBM brochure: "BARCO VIPDesigner Software for the IBM InfoColor 70 Printer" (1998).

Colorbus Advertisement: "There's One in Every Family," DocuWorld, Issue 1, vol. 2, p. 2 (1998).

DocuWorld Product Watch: "Authoring Tool for Variable Information Jobs," DocuWorld, Issue 1, vol. 2, p. 72 (1998).

Drennan, Bill, et al., "Xerox offers programming language," The Seybold Report on Publishing Systems, 27(7), p. 9 (Dec. 1997).

Eldad, Gefen, "Getting Personal, Printing your first personalized job may be easier than you think", DocuWorld Issue 1, vol. 2, p. 42 (1998).

Group 1 Software Advertisement: "DOC1 Delivers What You Want, When You Need It," DocuWorld, Issue 1, vol. 2, p. 23 (1998).

Indigo Brochure: "Indigo Yours Truly Personalization—Profitability" (1997).

Meadows Information Systems Flyer : "DataMerge—Personalize documents with this powerful XTension to QuarkXPress" (undated).

Meadows Information Systems Flyer : "Group Picture—Save complete Groups of QuarkXPress items in their original layout" (undated).

Scitex/Xerox Advertisement: "Xerox and Scitex Bring You the Magic of Professional Color," DocuWorld, Issue 1, vol. 2, p. 39 (1998).

Scitex brochure: "Scitex Darwin: Powerful Variable Information Tool for Scitex DFEs" (undated).

Group 1 Software Internet Website: "Group 1 Software: EZ–LETTER" (Oct. 31, 1998), URL: www.group1software.com/products/ds.asp.

Indigo Internet Website: "Yours Truly Software" (Oct. 29, 1998), URL: www.indigonet.com/yours_truly.htm.

Meadows Information Systems Internet Website: "About Meadows Information Systems, Inc.", URL: www.meadowsinfo.com/mishtml/meadows.htm (Oct. 27, 1998).

Meadows Information Systems Internet Website: "Auto-Price XTension to QuarkXPress by Meadows Information Systems", URL: www.meadowsinfo.com/mishtml/autopric.htm (Oct. 27, 1998).

Meadows Information Systems Internet Website: "Data-Merge XTension to QuarkXPress by Meadows Information Systems", URL: www.meadowsinfo.com/mishtml/datamerg.htm (Oct. 27, 1998).

Meadows Information Systems Internet Website: "Group Picture XTension to QuarkXPress by Meadows Information Systems" (Oct. 27, 1998), URL: www.meadowsinfo.com/mishtml/grouppic.htm.

Scitex Internet Website: "Scitex Darwin Desktop 2.0 is Now Shipping," URL: www.scitex.com/press/english/darwin2.htm (Oct. 29, 1998).

T/R Systems Internet Website: "About T/R Systems" (Nov. 2, 1998), URL: www.trsystems.com/tr_docs/About.htm.

Varis Corporation Internet Website: "Varis Corporation and Scitex Digital Printing Annouce World Wide Co–Marketing Agreement for High Speed Variable PostScript Printing," URL: www.variscorp.com/ns/ns.sci.html#pr (Nov. 2, 1998).

Varis Corporation Internet Website: "Redefining the process . . . VariScript Software," URL: www.variscorp.com/pro/text.html (Nov. 2, 1998).

DPS Internet Website: "Applications," URL: www.databasepub.com/left.html (Oct. 31, 1998).

DPS Internet Website: "Catalog Genie Grants Wishes", URL: www.databasepub.com/catsoftware.html (Oct. 31, 1998).

DPS Internet Website: "DPS Introduces Catalog Genie" (Oct. 31, 1998), URL: www.databasepubl.com/genie.html.

DPS Internet Website: "DPS Introduces New Release of Catalog Genie" (Oct. 31, 1998), URL: www.databasepub.com/genie2.html.

Elixir Internet Website: "Xerox to Distribute and Support Elixir's Opus (R) Worldwide," URL: www.elixirnt.elixir.com/nwsevnt. (Oct. 31, 1998).

Elixir Internet Website: "Elixir Products" (Oct. 31, 1998), URL: www.elixir.com/Products/products.htm.

Elixir Internet Website: "Opus," URL: www.elixir.com/Products/opus.htm (Oct. 31, 1998).
Elixir Internet Website: "DataMerge," URL: www.elixir.com/Products/dmerge.htm (Oct. 31, 1998).
Elixir Internet Website: "AppBuilder for AFP," URL: www.elixir.com/Products/appafp.htm (Oct. 31, 1998).
Elixir Internet Website: "AppBuilder for VIPP" (Oct. 31, 1998), URL:www.elixir.com/Products.appvipp.htm.
Em Software Internet Website: "Welcome to Em Software on the Web!" (Oct. 31, 1998), URL: www.emsoftware.com/.
Em Software Internet Website: "Em Software—Products" (Oct. 31, 1998), URL: www.emsoftware.com/products.html.
BARCO Graphics Internet Website: "BARCO Graphics wins Seybold Award for variable data," URL: www.barco.com/graphics/press/pr162ice.htm (Oct. 29, 1998).
BARCO Graphics Internet Website: "VIPDesigner Technical Specifications" (Oct. 29, 1998), URL: www.barco.com/graphics/data/vipdesigf.htm.
BITSTREAM Internet Website: "Application Products: PageFlex™", (Oct. 29, 1998), URL: www.bitstream.com/products/application/pageflex/index.html.
Colorage/Splash Internet Website: "Splash Technology, About Our Company," URL: www.colorage.com/company/about.html (Oct. 30, 1998).
Colorage/Splash Internet Website: "Splash Launches DocuPress Series of Servers for Xerox Midrange Digital Color Copiers" (Oct. 30, 1998), URL: www.colorage.com/company/press98/9803Mar2.html.
Document Sciences Corporation Internet Website: "Document Sciences Corporation," URL: www.xerox.com/alliance/psg/docsci.htm (Oct. 31, 1998).
Document Sciences Corporation Internet Website: "Products and Solutions," URL: www.docscience.com/product.htm (Oct. 31, 1998).
Document Sciences Corporation Internet Website: "Tomorrow's Technology is Today's Reality," URL: www.docuscience.com/products/compuset.htm (Oct. 31, 1998).
DPS Internet Website: "DataBase Publishing Software, About DPS" (Oct. 31, 1998), URL: www.databasepub.com/about.html.
DPS Internet Website: "Expert Publisher: Intelligent Automation", URL: www.databasepub.com/newpub.html (Oct. 31, 1998).
DPS Internet Website, URL: www.databasepub.com/bottom.html (Oct. 31, 1998).
"Variable Data on Digital Presses: Making Progress," *The Seybold Report on Publishing Systems*, 25(22), pp. 3–8 (Aug. 26, 1996).
*Seybold Report on Publishing Systems*, 25(22), ISSN: 0736–7260, Aug. 26, 1996.
"Variable Postscript and the Coming of Age of Electronic Print–for–Profit," *Print on Demand Business*, May/Jun. 1996, pp. 64–67.
"Variable–Data Printing Comes of Age: Capabilities & Market Demand Converge," *Seybold Report on Publishing Systems*, 27(2), pp. 3–24 (Sep. 15, 1997).
Indigo Variable Data Solution Evaluation, Interoffice Memorandum from R.R. Connelley & Sons Company dated Jul. 26, 1995 (portions redacted).
AGFA Internet Website: "Chromapress Software" (Oct. 30, 1998), URL: www.agfahome.com/products/printing/software.html.
AGFA Internet Website: "Digital Color Printing System: Personalizer–X v2.0, Variable Data Software for Chromapress" (Oct. 30, 1998), URL: www.agfahome.com/products/printing/software/personalizerx.html.
Atlas Internet Website: "PrintShop Mail" (Oct. 30, 1998), URL: www.atlassoftware.n1/products/psmail/psmail.html.
Atlas Internet Website: "Atlas Software Products" (Oct. 30, 1998), URL: www.atlassoftware.n1/products/products.html.
BARCO Graphics Internet Website: "Variable Information Printing" (Oct. 29, 1998), URL: www.barco.com/graphics/systems/vip/viphome.htm.
BARCO Graphics Internet Website: "BARCO Graphics VIP concept gives digital printing its true original dimension," URL: www.barco.com/graphics/press/pr178ife.htm (Oct. 29, 1998).
Ultimate Technographics, Inc. Manual, "Poststrip," (1989).
Dieckmann, Glenn, "Press Imposition for IBM 4250, General Information," R.R. Donnelley & Sons Company, Crawfordsville Manufacturing Division, Department CHT ( Feb. 21, 1989).
*Alpha Four, New Version 3*, "True Relational Database Power Without Programming, Reference Manual," Alpha Software Corporation, Lession 20: Using Sets and Lession 22: Advanced Sets: One–to–Many Links (1993).
"Design Your Forms, Power With Room To Grow: Xbasic™," advertisement, DBMS Magazine (Sep. 1994).
Xeikon announcement, "Xeikon announces new RIP for the DCP–1 digital color press," (Sep. 13, 1994).
"Finding the Right Niches for Electronic Printing," *The Seybold Report on Desktop Publishing*, pp. 12–18 (Mar. 7, 1994).
Xeikon brochure, "Beta Specifications, Xeikon DCP–1 Digital Color Press," date unknown.
Barco Graphics brochure, "RIP and Electronic Collation System for Xeikon DCP–1 Digital Printing Press," with Addendum 1 (Feb. 2, 1994).
European Search Report (Jul. 22, 1999).
"Agfa's CR–A RIP varies data," *Seybold Special Report*, 3(2) (Oct. 10, 1994).
"Agfa poised to enter short–run color market. (Chromapress electrophotographic digital press system)," *MacWeek*, p. 18 (Oct. 31, 1994).
"Agfa Holds Expo, US Launch of ChromaPress Digital Printing," *Newsbytes News Network* (Nov. 4, 1994).
"The Latest Word," *The Seybold Report on Publishing Systems*, 24(6) (Nov. 30, 1994).
"Agfa Expo: the medium is the message," *The Seybold Report on Publishing Systems*, p. 17 (Nov. 30, 1994).
"The Latest Word: Chromapress varies data," *The Seybold Report on Publishing Systems*, p. 28 (Mar. 13, 1995).
"The Latest Word," *The Seybold Report on Publishing Systems*, 24(13): 26–28 (Mar. 13, 1995).
"Digital Color Printing in Japan: A Report from Early Users," *The Seybold Report on Publishing Systems*, 24(13): 13–19 (Mar. 13, 1995).
"Indigo Expands Digital Press Line to Packaging; Enhances E–Print 1000," *The Seybold Report on Publishing Systems*, 24(13):3–12 (Mar. 13, 1995).
"Variable–data and custom printing," *Seybold Special Report*, 3(8): 63–64 (Apr. 21, 1995).
"Moore announces new digital printing strategy," *Seybold Special Report*, 3(8):65 (Apr. 21, 1995).

"Agfa Let RIP with Gemini," *M2 Presswire* (Apr. 27, 1995).

"Company–by–Company Guide to the Show: Agfa–Gevaert," *The Seybold Report on Publishing Systems,* 24(17):6 (May 1, 1995).

"Digital printers push customization," *The Seybold Report on Publishing Systems,* 24(19): 10–11 (Jun. 12, 1995).

"Agfa 'distributes and prints,' adds new RIP," *The Seybold Report on Publishing Systems,* 24(20): 8–10 (Jun. 26, 1995).

"Indigo System Developments: Indigo varies data, shows Mobius, Omnius," *The Seybold Report on Publishing Systems,* 24( 20):12–15 (Jun. 26, 1995).

"Barco features PrintStreamer, ToneSaver," *Seybold Special Report,* 24(20): p. 11 (Jun. 26, 1995).

"Short–Run Digital Color Printing," *Seybold Special Report,* 4(2):33–34 (Oct. 23, 1995).

"T/R Systems set new price point for digital presses," *The Seybold Report on Publishing Systems,* p. 35 (Oct. 23, 1995).

"Color, Here and Now," *Printing Impressions,* p. 28 (Nov. 11, 1995).

"Digital presses eye the market of one," *Graphic Arts Monthly,* p. 42 (Apr. 1, 1996).

"The 'On Demand' Show: Exciting Technology–But Is the Market Ready?," *The Seybold Report on Publishing Systems,* 25(16): pp 3, 5–6 (May 17, 1996).

"Indigo," *The Seybold Report on Publishing Systems,* 25(16): pp. 5–6 (May 17, 1996).

"Personalization for Indigo Engines," *The Seybold Report on Publishing Systems,* 25(22), pp. 9–13 (Aug. 26, 1996).

\* cited by examiner

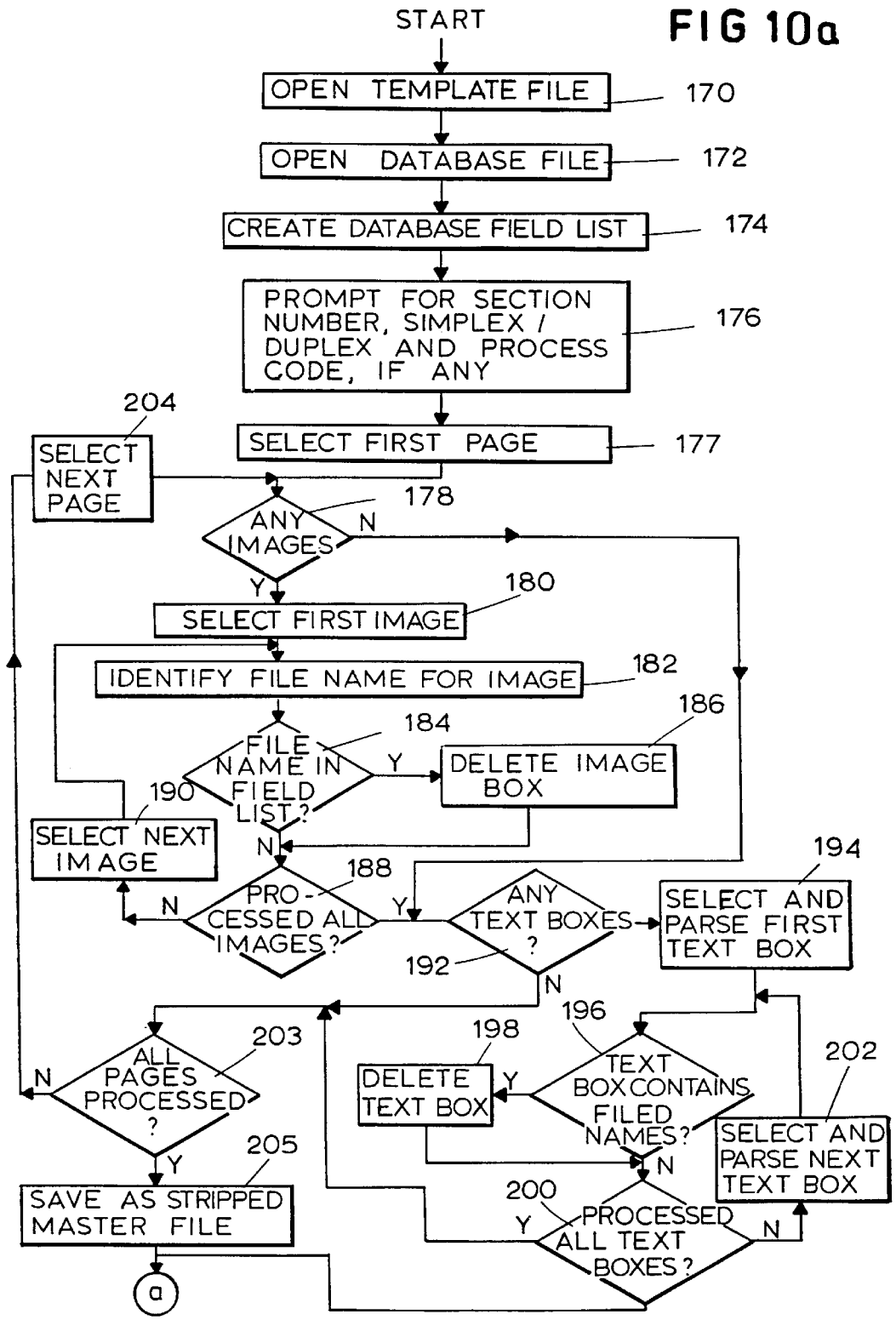

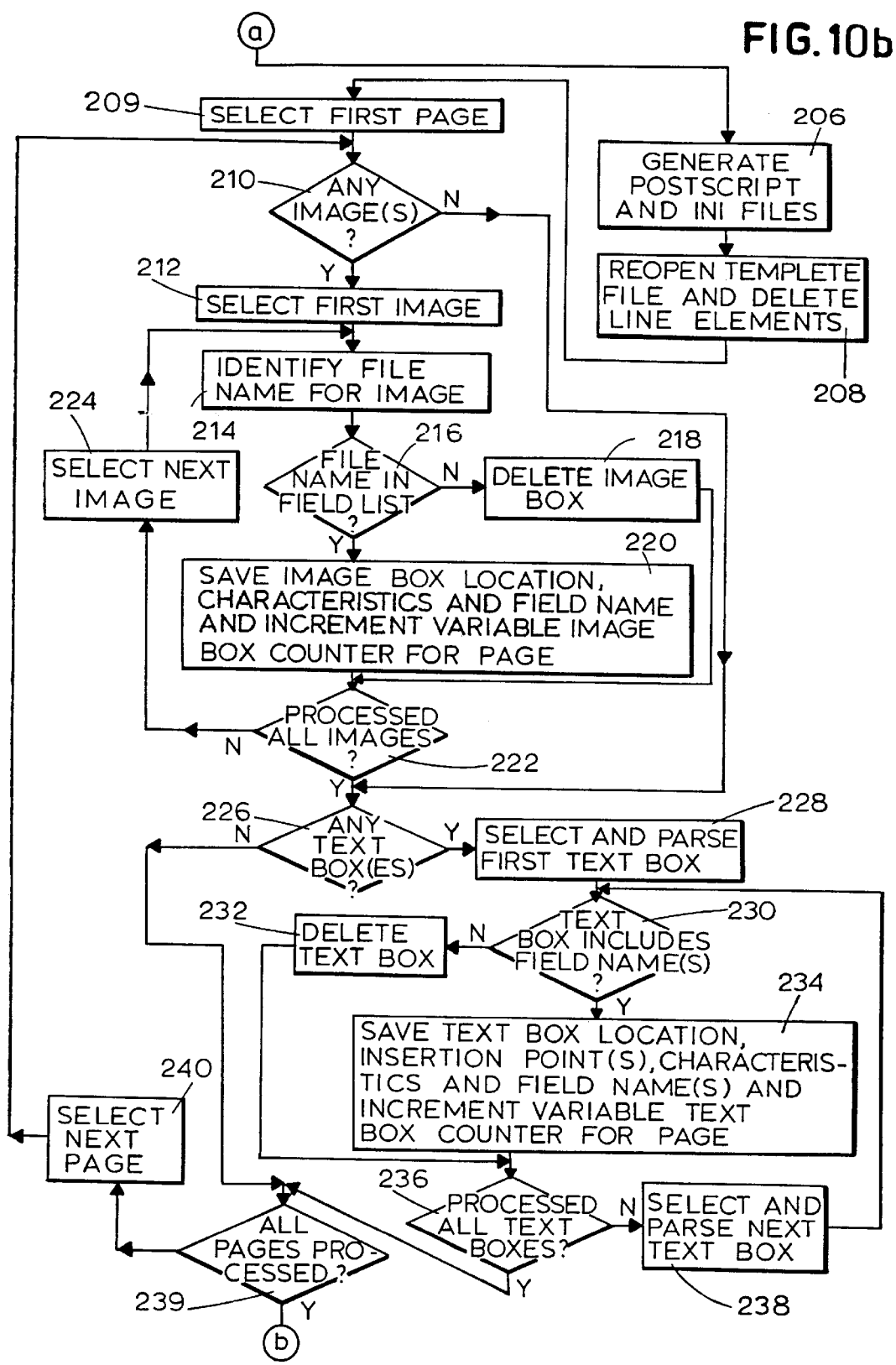

VARIABLE IMAGING USING AN ELECTRONIC PRESS

This is a continuation of U.S. application Ser. No. 08/478,397, filed Jun. 7, 1995 now U.S. Pat. No. 6,327,599.

TECHNICAL FIELD

The present invention relates generally to reproduction methods and systems, and more particularly to a method of and system for selectively reproducing images.

Background Art

Most printing systems in use today utilize printing plates or cylinders which are engraved or photochemically processed to create an image thereon. Ink is then deposited on the plate or cylinder and the ink is thereafter transferred to a substrate, such as paper. In a conventional printing press, a number of pages are printed on a sheet of paper to form a signature which is then folded and assembled with other signatures. The assembled signatures are then bound, trimmed and finished by finishing apparatus to produce finished books, such as magazines, catalogs or any other printed and bound matter.

Often, there is a need to produce different versions of books and/or customized books within a single press run. For example, it may be desirable to produce a number of standard books together with a number of books having additional and/or different signatures or pages therein. Also, it may be necessary or desirable to provide customized information in the form of an address label, personalized information or the like on the inside or outside of finished books. In either case, conventional printing systems are not easily adaptable to produce books of these types.

A printing system which has the ability to produce differing book versions and/or books with customized information is disclosed in Riley U.S. Pat. No. 4,121,818, assigned to the assignee of the instant application. The printing system includes a number of packer boxes disposed adjacent a binding chain wherein each packer box stores a plurality of signatures. A control is included for controlling the packer boxes to selectively feed signatures onto chain spaces of the binding chain so that books of varying content can be produced. Customized information can be printed on the signatures by means of an ink jet printer which is selectively operated by the control. Other types of customization can be effectuated, such as by inserting or onserting cards or the like.

Other systems for producing customized books are disclosed in Abrams et al. U.S. Pat. No. 3,899,165, Wong et al. U.S. Pat. Nos. 4,500,083 and 4,674,052, Wong U.S. Pat. No. Re 32,690 and Berger et al. U.S. Pat. Nos. 4,768,766 and 4,789,147.

Image manipulating systems have been developed which permit gathering of images in an office or home environment. For example, conventional word processing programs, such as Microsoft® Word®, WordPerfect® and the like, permit a user to import images into a page and also allow a user to command which pages of a document to print. In addition, macros (i.e., a sequence of commands) can be assembled and executed within these programs which can allow printing of particular document pages in a certain order. Still further, most word processing programs have merge capability wherein a customized image is merged with other standardized information and printed or displayed. As one example, customized information in the form of addressee and address information may be merged with standardized return address information and printed on a series of envelopes.

A different image gathering capability provided by CAD (computer aided design) software, sometimes referred to as "layering," involves the creation and storage of a base page and one or more layer pages. A user can issue commands to display or print the base page and one or more of the layer pages simultaneously atop one another to achieve an effect similar to the overlay of transparencies so that a composite page appearance results.

While the foregoing image manipulating systems allow some image gathering capability, none is effective to assist in the rapid production of different book versions. Of course, CAD systems are primarily designed for line art and not text nor graphic images, and hence are of only limited use. Further, if one were to use word processing software to produce book versions it would be necessary to issue commands to separately print the pages of each book version just before such version is to be produced. That is, a user would have to create and store pages to be included in a first book version and then command the software to print as many copies of the first version as are needed. Thereafter, the user would have to recall the pages of the first version from memory, edit and store the pages to create pages to be included in a second book version and then command the system to print the required number of books of the second version. Similar steps would have to be undertaken for each other book version to be produced. Alternatively, the pages of the different book versions could be created and stored and thereafter printed together. In either event, where many book versions are to be produced, such a process would be quite time-consuming. In addition, image importation and merge routines provided as a part of word processing software are adapted for use on a subpage basis only and hence are of only limited usefulness in the book production environment. Still further, data manipulated by word processing software are largely (if not entirely) in symbolic format. As a result, data to be displayed or printed must be first rasterized by a raster image processor (RIP), which utilizes complex and time-consuming computational routines which further increase production time to an economically impractical level.

Recently, new printing systems have been developed, called "demand printers," which are capable of high speed printing of images from electronic representations thereof. The demand printer produces high quality color images using a set of fusible toners in an electrophotographic process. More particularly, a web of paper is passed adjacent a series of drums, each of which has been electrostatically charged according to an image pattern for a particular color to be applied to the web. The charge is transferred to the paper and an oppositely charged toner of the proper color is brought into contact with the paper. The oppositely charged web and toner attract so that the toner is held on the paper as other colors are applied thereto. The toners and paper are thereafter heated to fuse the toners to the paper to produce the final image. The web is then cut into sheets (or "forms") and the forms are further processed as needed to produce a final product.

Unlike conventional presses which utilize engraved or photochemically prepared plates or cylinders, demand printers are capable of rapidly printing high quality images of differing content owing to the fact that the images are produced by an electrophotographic process. That is, instead of the need to replate and re-engrave a gravure cylinder when a different image is to be printed therewith, it is only necessary to change the charge applied to the drums of the printer in order to make such change. Thus, different images can be printed by the same printer without significant delays. This advantage makes the demand printer desirable for use in certain production environments. However, applicants are currently unaware of any systems developed by others which utilize this advantage to produce differing book versions in an efficient manner.

SUMMARY OF THE INVENTION

In accordance with the present invention, an apparatus and method for controlling a display device such as an electronic press permits the display of fixed and variable information in a simple and effective manner.

More particularly, an apparatus and method for controlling a display device such as an electronic press includes means for and the steps of developing first and second sets of template data representing associated first and second template pages, respectively, wherein each set of template data includes master data representing fixed information and area data representing an area of the page for variable information. A database is also developed having a number of entries each of which represents variable information. The display device is operated in accordance with the sets of template data and the entries in the database such that the first and second template pages are displayed with selected variable information.

Preferably, the sets of template data and the database are converted into commands for the display device specifying sequence and content of page display.

Also preferably, the sets of template data are separated into master files containing master data and intermediate variable page files having area data. Final variable page files are derived from the database and the intermediate variable page files, wherein the final variable page files include content data representing variable printed information. The commands may be developed from the master page files and the final variable page files.

According to a further aspect of the present invention, an apparatus for controlling an electronic press wherein the press includes a controller responsive to press commands includes first means for developing a template file defining pages to be printed with fixed information common to all of the associated pages and variable information unique to each page, as well as means for assembling a database having entries therein each representing variable information to be printed. Second means are responsive to the first developing means for developing a master page file from the template file wherein the master page file defines the fixed information. Means are responsive to the assembling means and the first developing means for converting the template file and the database into press commands specifying sequence and content of page production by the press.

In accordance with yet another aspect of the present invention, an apparatus for controlling an electronic press wherein the press includes a controller responsive to press commands includes first means for developing a plurality of template files each defining associated pages to be printed with and having first data defining fixed information common to all of the associated pages and variable information unique to each associated page. At least one of the template files further includes second data defining a particular area in each associated page for the printing of variable information therein and third data identifying at least one of the database entries. Means are provided for assembling a database having entries therein each representing variable information to be printed. Second means are responsive to the first developing means for developing a master page file from the template file wherein the master page file includes data defining the fixed information only. Means are responsive to the assembling means and the first developing means for converting the template files and the database into press commands specifying sequence and content of page production by the press.

The apparatus and method of the present invention permit high speed printing of quality images and are particularly suited to the production of differing book versions and/or books with customized and/or personalized information within a single production run.

Other features and advantages are inherent in the apparatus claimed and disclosed or will become apparent to those skilled in the art from the following detailed description in conjunction with the accompanying drawings.

DESCRIPTION OF THE PREFERRED EMBODIMENTS

Figure 1:
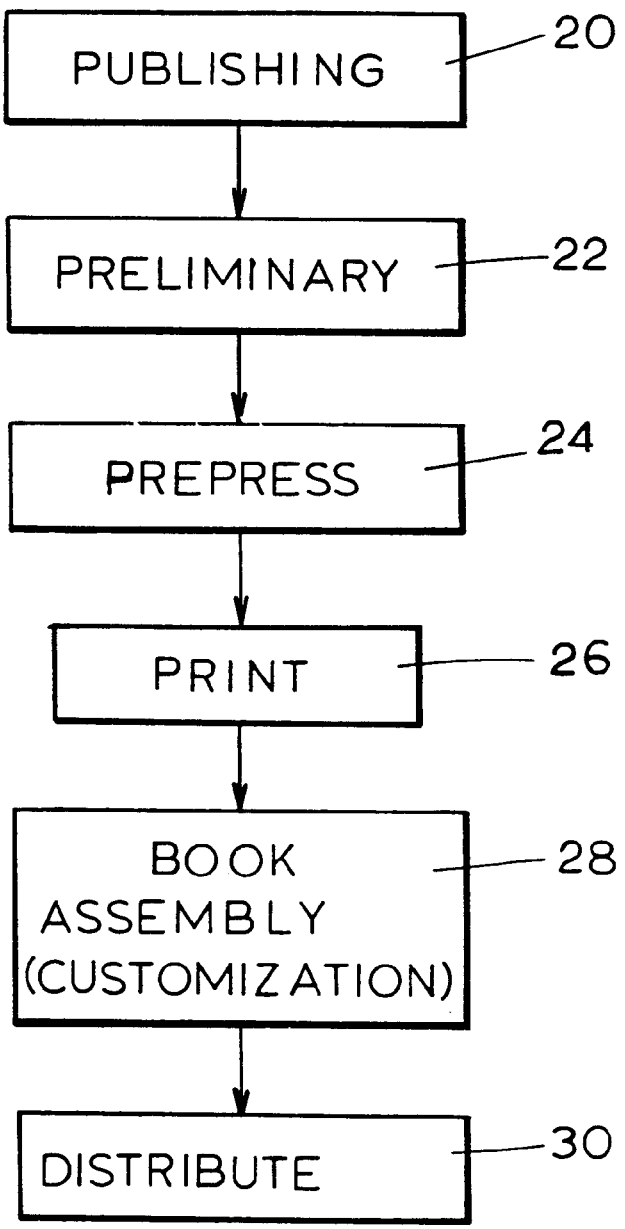
FIG. 1 is a block diagram illustrating a prior art method of producing books.

FIG. 1 illustrates a prior art method of producing books, for example as shown in the above-identified Riley et al. '818 patent identified above. During a publishing step 20, the contents of one or more book versions are determined. Each version may comprise, for example, a set of standard or common pages. In addition, some of the versions may include one or more additional pages or other customized information. Thereafter, during a preliminary step 22, color correction of color images is undertaken together with undercolor removal and screening for halftone images. During a prepress step 24, page imposition is effected and printing cylinders or plates are prepared. The plates or cylinders are then used during a printing step 26 to prepare signatures which are loaded into packer boxes (not shown). As noted in the Riley et al. '818 patent identified above, the signatures are then selectively collected on a gathering chain (not shown) during a book assembly step 28 and the gathered signatures are bound and trimmed to create the books. The books are thereafter distributed during a step 30 to users via one or more distribution systems, for example, the U.S. Postal Service.

As should be evident from the foregoing, customization occurs during the book assembly step 28, inasmuch as the choice of particular signatures to be included in a book is made at that time. In addition, customized information can be printed onto selected signatures using an ink jet printer disposed adjacent the gathering chain. Thus, for example, addressee information can be printed by the ink jet printer on assembled books so that preprinted addressee labels need not be used. Other types of customization can be effected at this time, for example, by inserting or onserting cards into or onto a stack of collected signatures, affixing a specialized or customized cover on a gathered stack of signatures, or the like. Customization at this point in the production process is simpler and less expensive than, for example, separately printing each book version with customized information.

Figure 2:
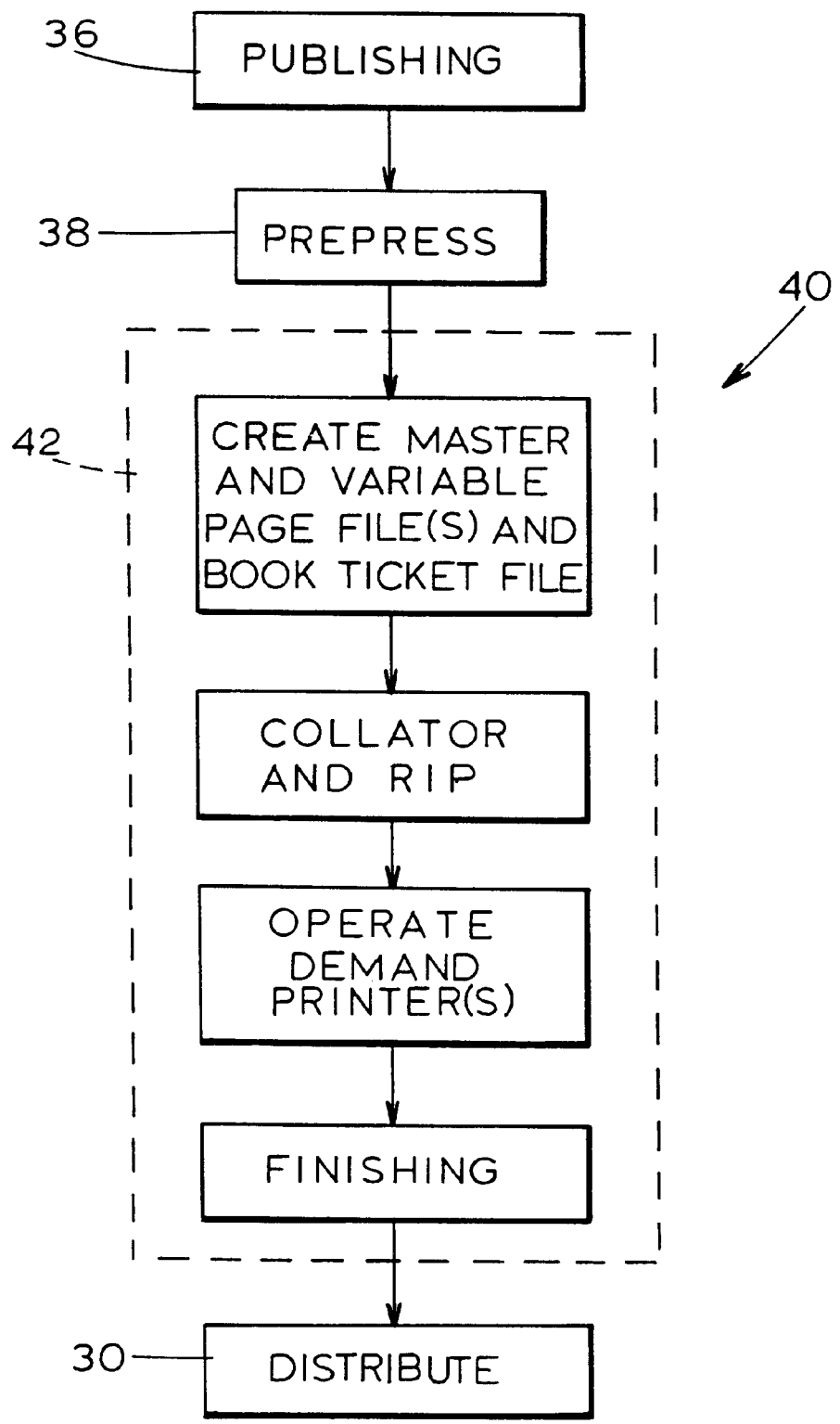
FIG. 2 is a block diagram of a method of producing books according to the present invention.

FIG. 2 illustrates a block diagram of a method 40 according to the present invention which may be used in place of the method of FIG. 1 to produce books. The method 40 includes a step 42 which utilizes the output of publishing and preliminary steps 36, 38 and produces books for distribution according to the step 30 of FIG. 1. The step 42 creates one or more master and variable page files in, for example, a page description language (PDL) such as PostScript® (Postscript® is a trademark of Adobe Systems, Inc. for its page description language) representing pages to be produced. In addition, as noted in greater detail hereinafter, a press command file is developed which specifies the manner in which data contained within the master and variable page files are to be merged to produced printed pages. The format of the press command file is specified by Barco Graphics of Gent, Belgium and is particularly suited for control of a DCP-1 digital color press manufactured by Xeikon of Mortsel, Belgium. It should be noted that the apparatus and method of the present invention are not limited to use with a particular type of demand printer or a particular system for controlling such a printer, inasmuch as the invention can be adapted for use with any type of printer or control whether located locally or remotely.

The master and variable page files and the press command file are converted by a collator and raster image processor (RIP) into bitmaps which may be stored in a memory. The stored bitmaps are used to control one or more demand printers and/or any other type of display device, such as a laser printer, a CRT, an LCD display or the like so that the device displays pages having fixed and variable information thereon. Alternatively, the master and variable page files may be premerged to create a plurality of combined files each representing a page to be reproduced with master and variable information. The combined files can be then sent to any type of printer or other display device, whether local or remote. Also, the combined files can be converted to a suitable format (e.g., Acrobat® PDF format) and transmitted to a remote location using a facsimile machine, e-mail or other transmission medium if desired.

During a finishing step, the assembled books are bound and trimmed and, if desired, further customization can be effected.

Figure 3:
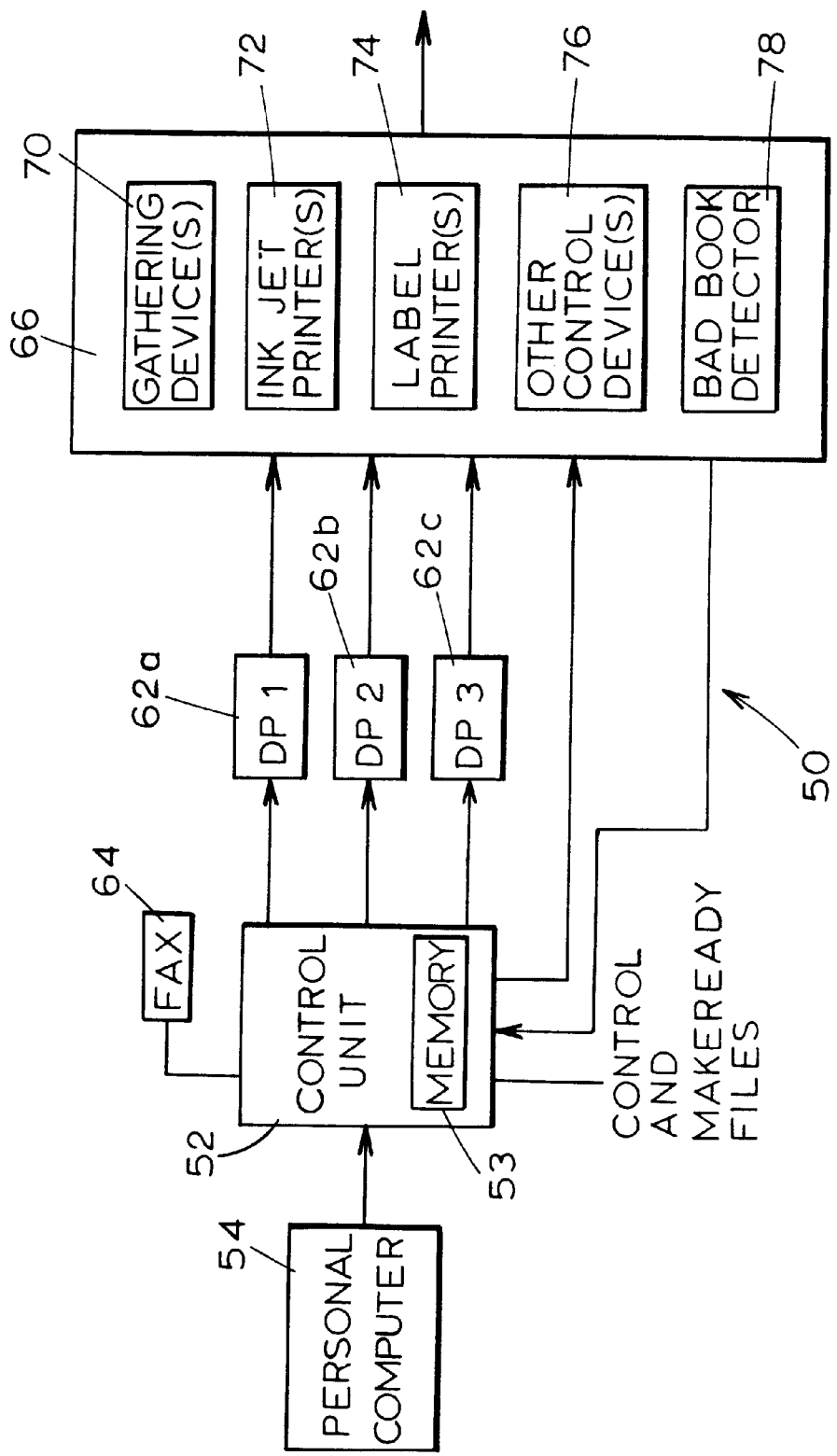
FIG. 3 is a block diagram illustrating an exemplary system for implementing the method of the present invention illustrated in FIG. 2.

FIG. 3 illustrates a system 50 which implements the steps 36, 38 and 42 in the method 40 of FIG. 2. A control unit 52, which may be implemented by a personal computer or another type of computer, includes a memory 53 and stores therein data representing images to be printed. As noted in greater detail hereinafter, the data may be specified by a publisher using a personal computer 54 or any other type of computer and may comprise one or more template files specifying pages to be produced with master or fixed printed information (i.e., printed information which does not vary from book to book of the same version) and variable printed information (which typically varies from book to book). The variable information may be stored in a database created by the publisher and the template file(s) specify the locations on particular pages for variable information stored in the database as noted in greater detail hereinafter.

If desired, image data may be obtained from any other type of device or devices, such as a scanner which scans input copy, data supplied over a network or any other source. The control unit 52 is further responsive to control and makeready files and causes one or more demand printing systems 62 to print desired pages. While three demand printing systems 62a–62c are illustrated in FIG. 3, it should be understood that the control unit 52 may operate a different number of demand printing systems, as desired. Also, the control unit 52 may operate a fax machine 64 and/or may communicate with other remote devices to send properly converted combined files, as desired and as noted above. The combined files may be printed or may alternatively be reproducible in a different medium and/or may comprise a non-static image or other information, i.e., movies or audio.

The pages printed by the demand printing system 62 may be supplied to a finishing apparatus 66 which includes various auxiliary production devices and device interfaces for assembling the pages to produce finished books which are ready for distribution. The finishing apparatus 66 may include one or more gathering devices 70 for gathering printed pages into books, one or more ink jet printers 72 for printing additional customized information, such as addressee information, on each book, one or more label printers 74 for printing address labels and/or other control devices 76. In addition, one or more detectors 78 may be provided to sense when a defective book is produced. The control unit 52 may be responsive to the output of the detector 78 to reorder a defective book at an appropriate point in the production sequence thereof so that advantage can be taken of postal discounts, if possible.

Figure 4:
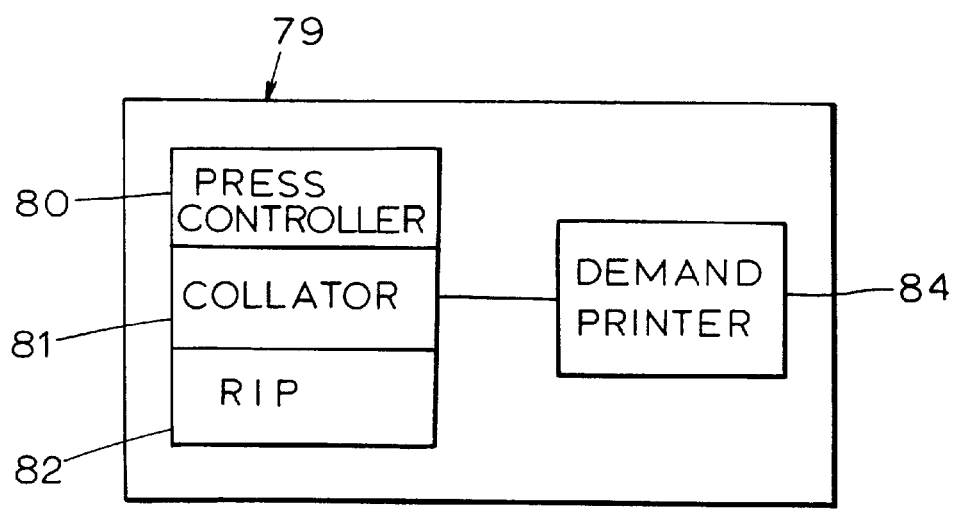
FIG. 4 is a block diagram illustrating one of the demand printing systems of FIG. 3 in greater detail.

FIG. 4 illustrates the demand print system 62a of FIG. 3 in greater detail, it being understood that the systems 62b and 62c are identical thereto. The system 62a includes a print system 79 having a press controller 80, a collator 81 and a raster image processor (RIP) 82 which are operable in response to press commands generated by the control unit 52. A collator is an electronic device for storing raster image processor files (i.e., bitmap files) and delivering selected files to a digital press in real time, such that the digital press can run at full speed while processing and printing unique page data for each book produced on the press. The RIP 82 converts the page files to bitmap format or any other format, such as a symbolic printer control language. The collator 81 includes memory in the form of mass storage drives and physical memory and collates the bitmap page files. If desired, the collator 81 and/or RIP 82 may comprise a part of the press controller 80. The controller 80 instructs the collator 81 to send page files to the demand printer 82. The print system 79 may comprise the PrintStreamer system, manufactured and marketed by Barco Graphics of Belgium, while the demand printer 82 may comprise the Xeikon DCP-1 digital color press noted above. It should be noted that a different print system and/or demand printer may alternatively be used, such as the Indigo printer manufactured by Indigo of NV, of Maastricht, Netherlands if desired.

Figure 5:
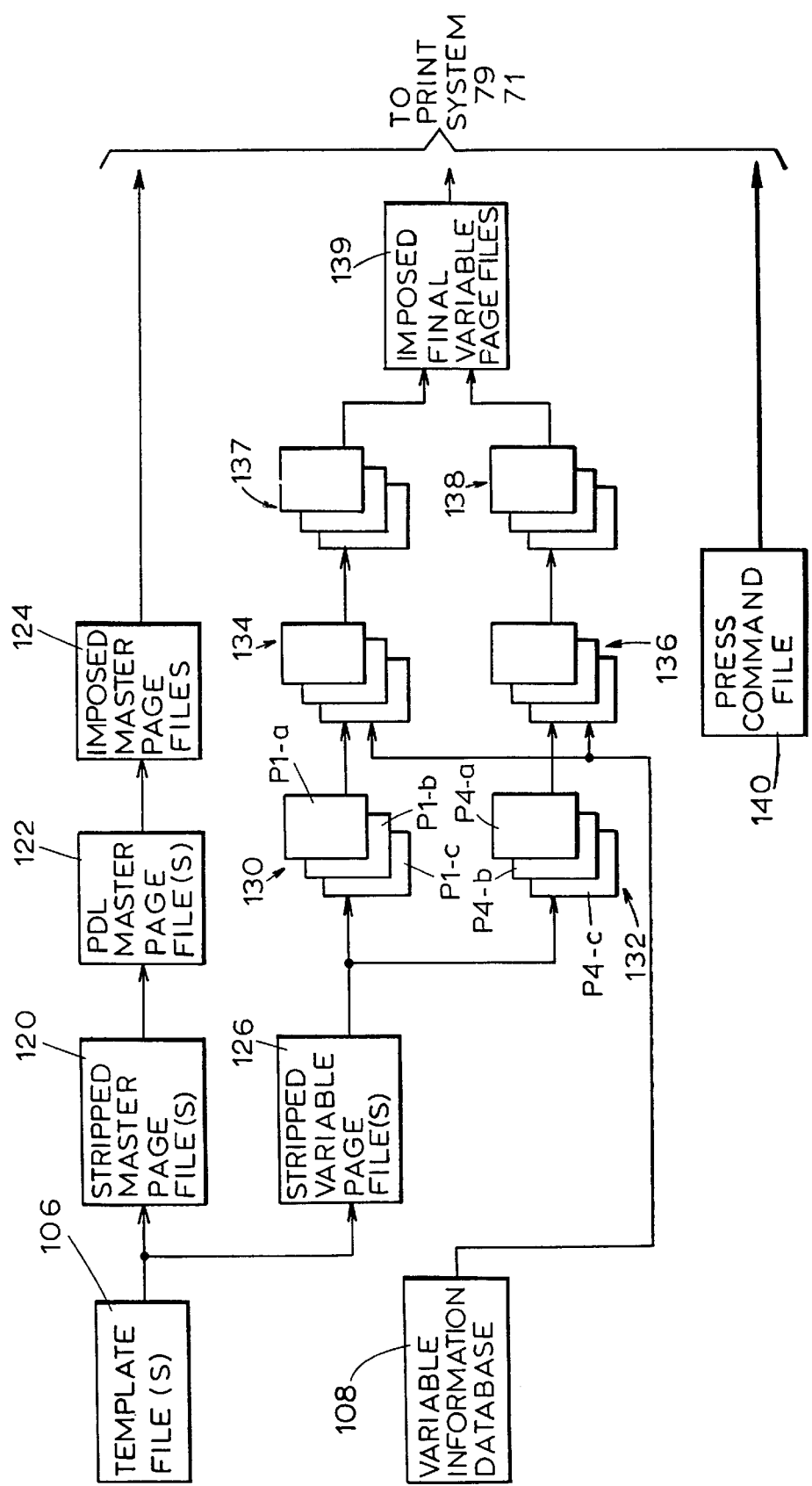
FIG. 5 is a generalized diagram of the steps implemented by the method of the present invention.
Figure 6A:
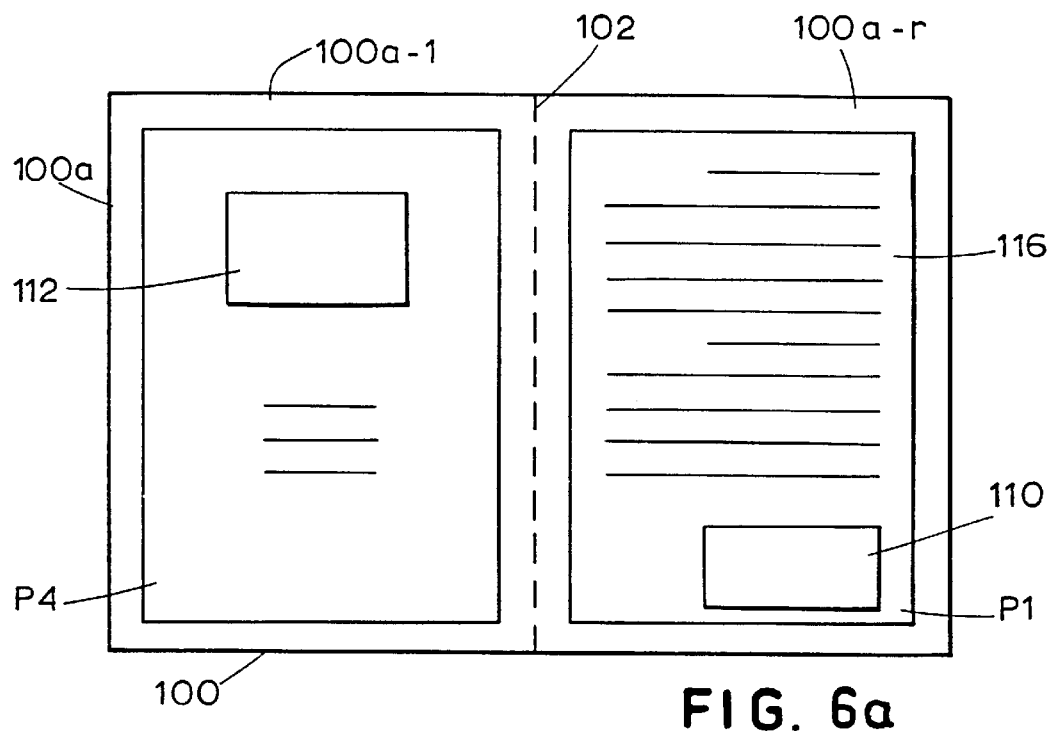
FIGS. 6a and 6b are elevational views of a sample book that may be produced by the present invention.
Figure 6B:
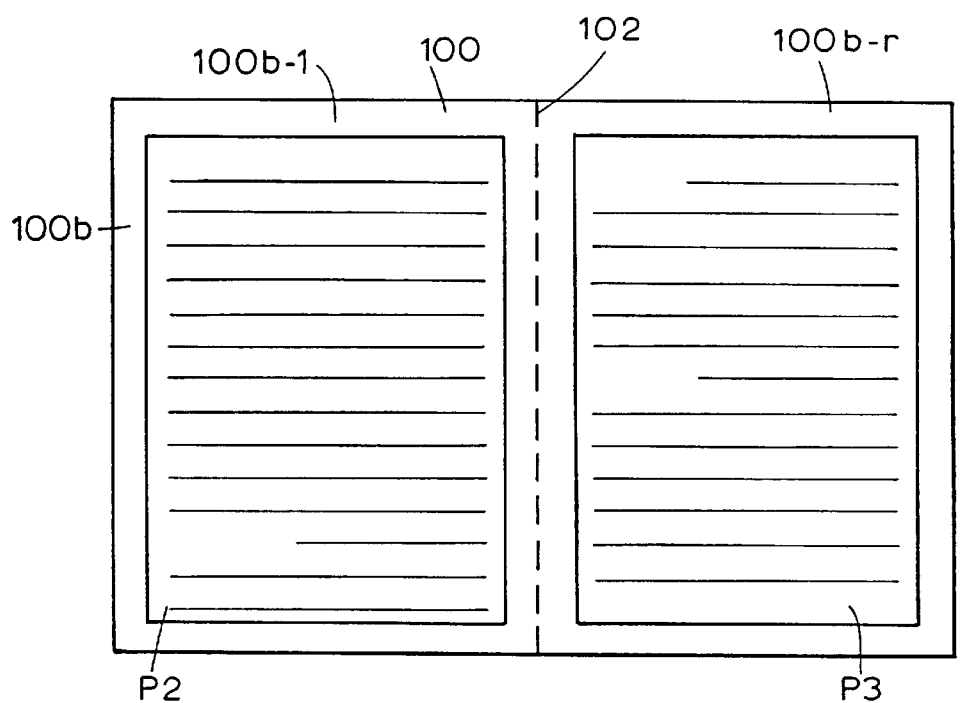

FIG. 5 illustrates in diagrammatic generalized form the method of the present invention. For the purpose of explaining the present invention, as a first example, it will be assumed that the demand print system 62a will be operated to produce three four-page books in the form of a brochure in duplex format. That is, as seen in FIGS. 6a and 6b, a first sheet of paper 100 is to be printed on a first side 100a with printed pages P1, P4 while a second side 10b of the sheet 100 is to be printed with pages P2, P3. In addition, pages P1–P4 are to be imposed such that the page P1 is placed on a right-hand portion 100a-r of the side 100a while the page P4 is placed on a left-hand portion 100a-1 of the side 100a. Further, the page P2 is to be placed on a left-hand portion 100b-1 of the side 100b while the page P3 is to be placed on a right-hand portion 100b-r of the side 100b. In this fashion, when the sheet of paper 100 is folded along a fold line 102 with the pages P1 and P4 on the outside, the pages P1–P4 will appear in sequence. Because each book to be produced in this example comprises only a single sheet of folded paper, the imposition process need not take into account shingling or bottling effects, although it should be noted that such effects may have to be taken into account when more than one sheet of paper is assembled with other sheets of paper to produce a book and/or when more than two pages are to be printed on a single side of a sheet of paper and thereafter assembled with other pages to create a book.

In addition to the foregoing, in the first example, assume that the three books to be produced include variable and fixed information on the first and last pages of each book and fixed information only on the remaining pages. For example, the page P1 may include variable information in the form of a personalized message, a variable image, or the like in an area 110 whereas the page P4 may include other variable information in an area 112, for example, postal information for mailing the brochure to an addressee. Corresponding front and back pages of the remaining books may include different variable information. The remaining printed information on pages P1–P4 is identical to the printed information on corresponding pages of the other two books.

Figure 7A:
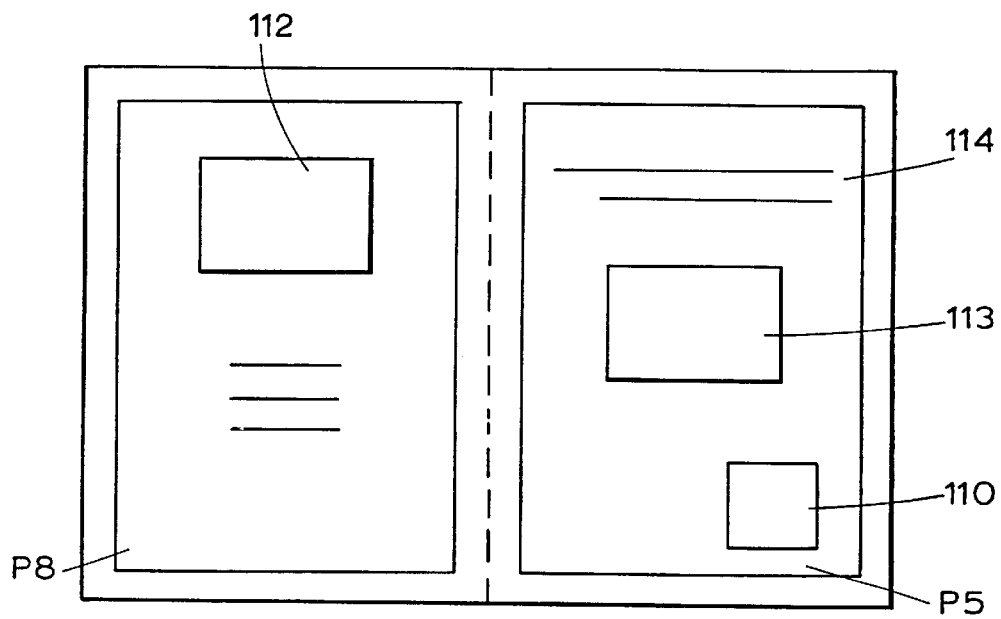
FIGS. 7a, 7b and 8a, 8b are elevational views of other sample books that may be produced by the present invention.
Figure 7B:
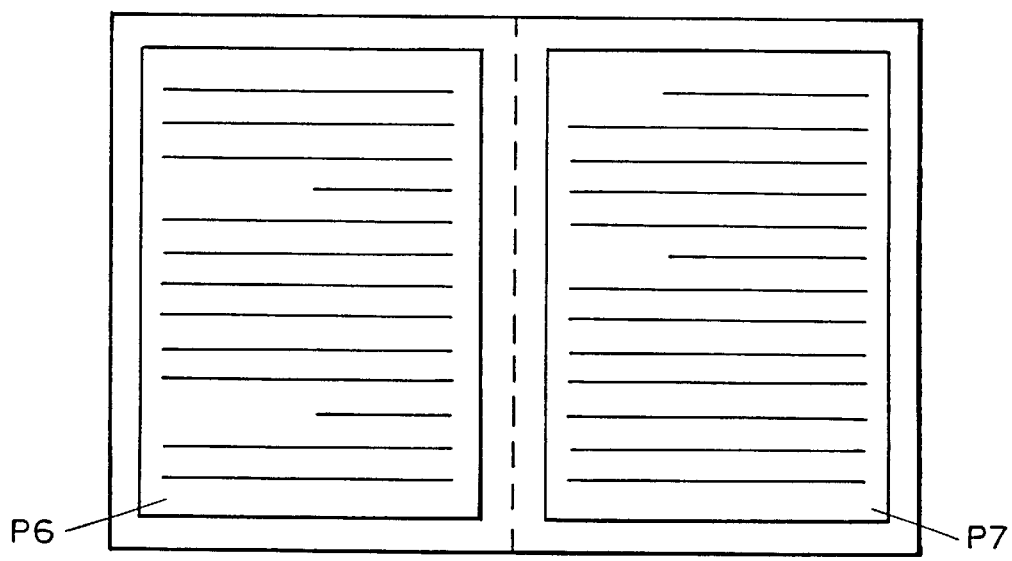

It should be noted that the present invention is not limited to production of books of the same "version" (i.e., books having the same master information). For example, the book versions of FIGS. 7a, 7b and 8a, 8b may be produced together with the book version of FIG. 6a and 6b in the same production run or job. The book version example of FIGS. 7a and 7b includes pages P5–P8 to be reproduced a number of times to produce individual books. The book version of FIGS. 7a and 7b is identical of the book version of FIGS. 6a and 6b except that an additional area 113 is provided on the page P5 for placement of variable information, in addition to the areas 110 and 112. Because of the addition of the area 113, the remaining master information appearing in an area 114 differs from master information appearing in an area 116 of the page P1 of FIG. 6a.

Figure 8A:
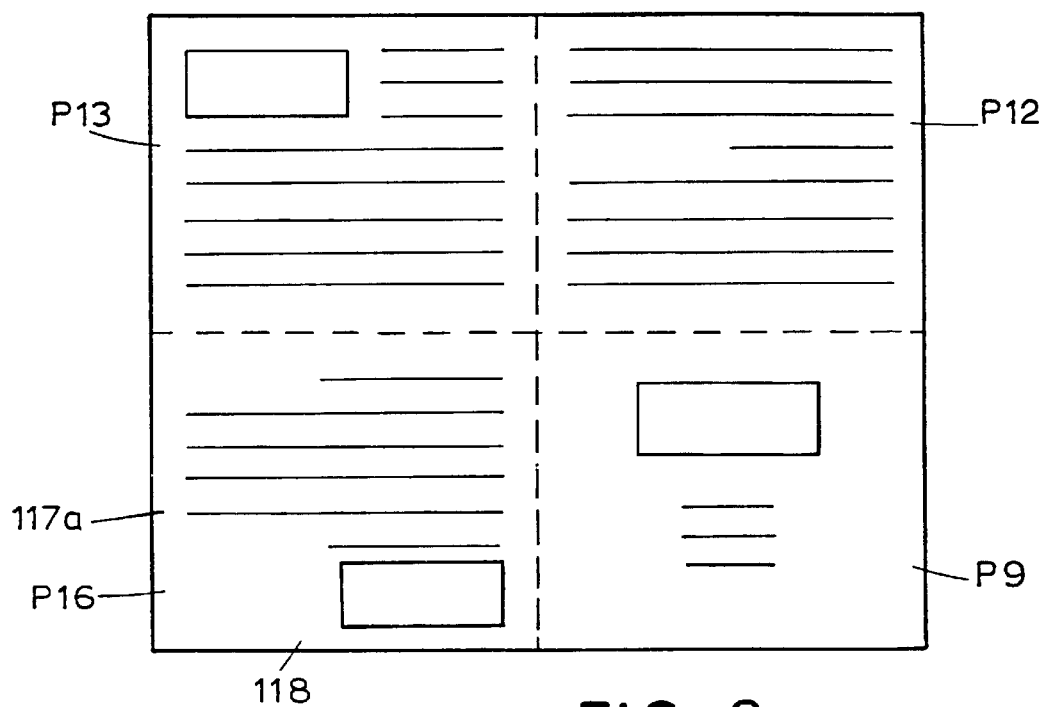
Figure 8B:
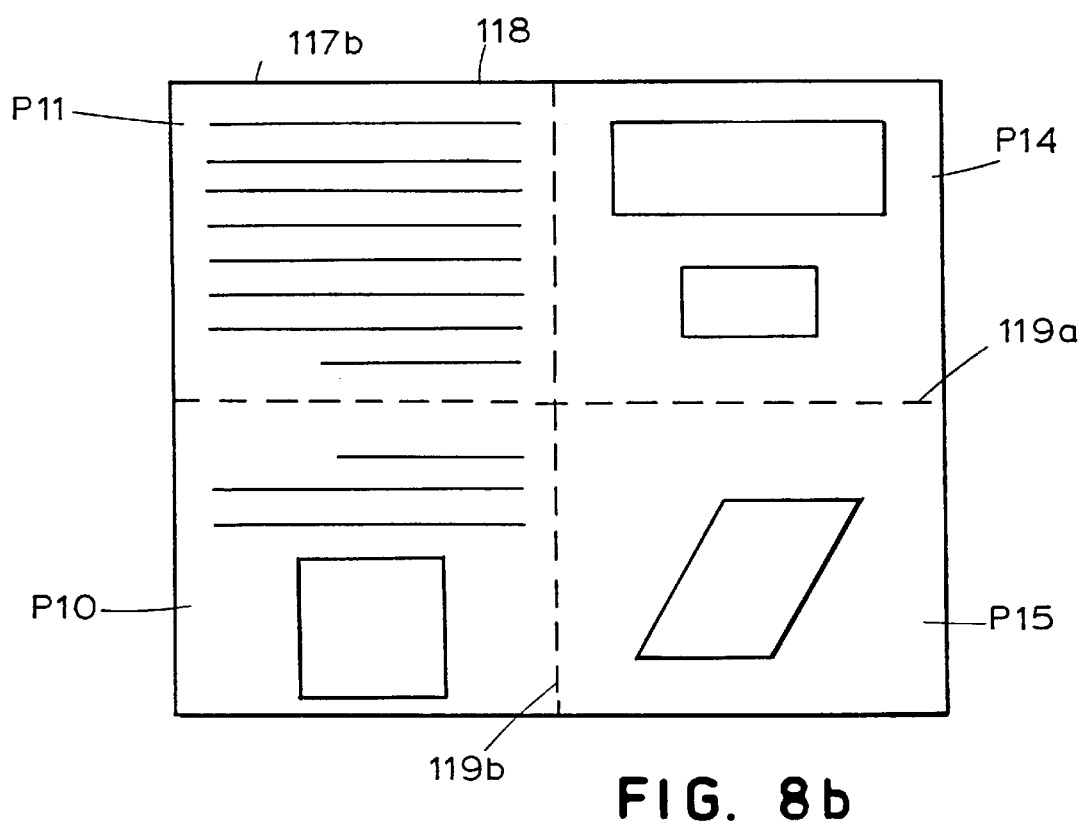

The book version example of FIGS. 8a and 8b differs from the book version examples of FIGS. 6a, 6b and 7a, 7b not only in terms of content of master and variable information, but also number of pages and page size. Specifically, eight pages P9–P16 are to be printed wherein the pages P9, P12, P13 and P16 are to be printed in a first side 117a of a sheet of paper 118 and the remaining pages P10, P11, P14 and P15 are to be printed on a second side 117b of the sheet 118. In addition, the pages P11–P14 are printed upside down relative to the remaining pages so that, when the sheet 118 is folded first along a fold line 119a and then along a fold line 119b, the resulting pages P9–P16 appear in order. Thereafter, the folded sheet 118 is trimmed to separate the pages P9–P16. As should be evident, the pages P9–P16 are one-half the size of the pages P1–P8, and further include different master and variable information thereon.

It should be noted that books assembled from multiple printed "forms" (defined in greater detail hereinafter) may alternatively or in addition be produced by the present invention, if desired.

Referring again to FIG. 5, one or more template files 106 are developed by a publisher specifying the content (including appearance) of fixed information and the positioning of all information (i.e., fixed and variable) on the different books or book versions. A database 108 is also developed by the publisher using the personal computer 54 specifying the content of variable information to be placed in variable information areas, for example, the areas 110, 112 on the pages P1, P4, respectively, of FIGS. 6a and 6b. The database 108 further includes control information, as noted in greater detail hereinafter.

The template files 106 include data specifying the position and content of fixed information on the pages to be printed. Specifically, the template files 106 define template pages wherein each template page includes data representing any fixed information to be reproduced on corresponding pages of the books or book versions and area data representing any area(s) on the corresponding pages where variable information is to be reproduced. The template files are duplicated to create working files. One set of working files is stripped of all area data relating to placement of variable information to create stripped master page files 120 defining template pages having only fixed information thereon. The stripped master page files are then converted into PDL master page files 122 expressed in a page description language, such as PostScript®. An optional imposition process may then convert the PDL master page files 122 into imposed master page files 124 each representing a side of a piece of paper to be printed with at least one, and, likely, two or more template pages having fixed information only thereon. Such a template page may be identical to that shown in FIG. 6a except that the areas 110 and 112 are removed therefrom.

A further set of working files is stripped of all fixed information to create stripped variable page files 126 defining template pages having fixed information removed therefrom and further having the area data defining the areas 110, 112. The data representing template pages having variable information thereon are expanded into a set of intermediate page files. In the example of FIGS. 6a and 6b where three books are to be printed, two intermediate page files 130, 132 are thus produced. The file 130 includes a file portion P1-a defining the position of variable information to be produced on the page P1 for the first book. Two other file portions P1-b and P1-c define the position of variable information to be produced on the front pages of the remaining two books. In like fashion, file portions P4-a, P4-b and P4-c represent the position of variable information to be reproduced on the last pages of the three books. At this point, data are also contained in each of the files 130, 132 identifying the entries in the database 108 to be placed in the areas 110, 112 during printing.

The files 130, 132 are then converted into variable page files 134, 136. The files 134, 136 are identical to the files 130, 132, respectively, except that the data in each file identifying entries in the database are replaced by the actual data stored at such entries.

The files 134, 136 are converted into files 137, 138 in a PDL format, for example, Postscript®. An optional imposition process may convert the PDL files into improved final variable page files 139.

The print system 79 operates in response to the press commands in a press command file 140 and merges the page files 122, 137 and 138 (if no imposition is to be effected) or to merge the page files 124 and 139 (if the pages are imposed) to create the finished books or book versions.

Figure 9:
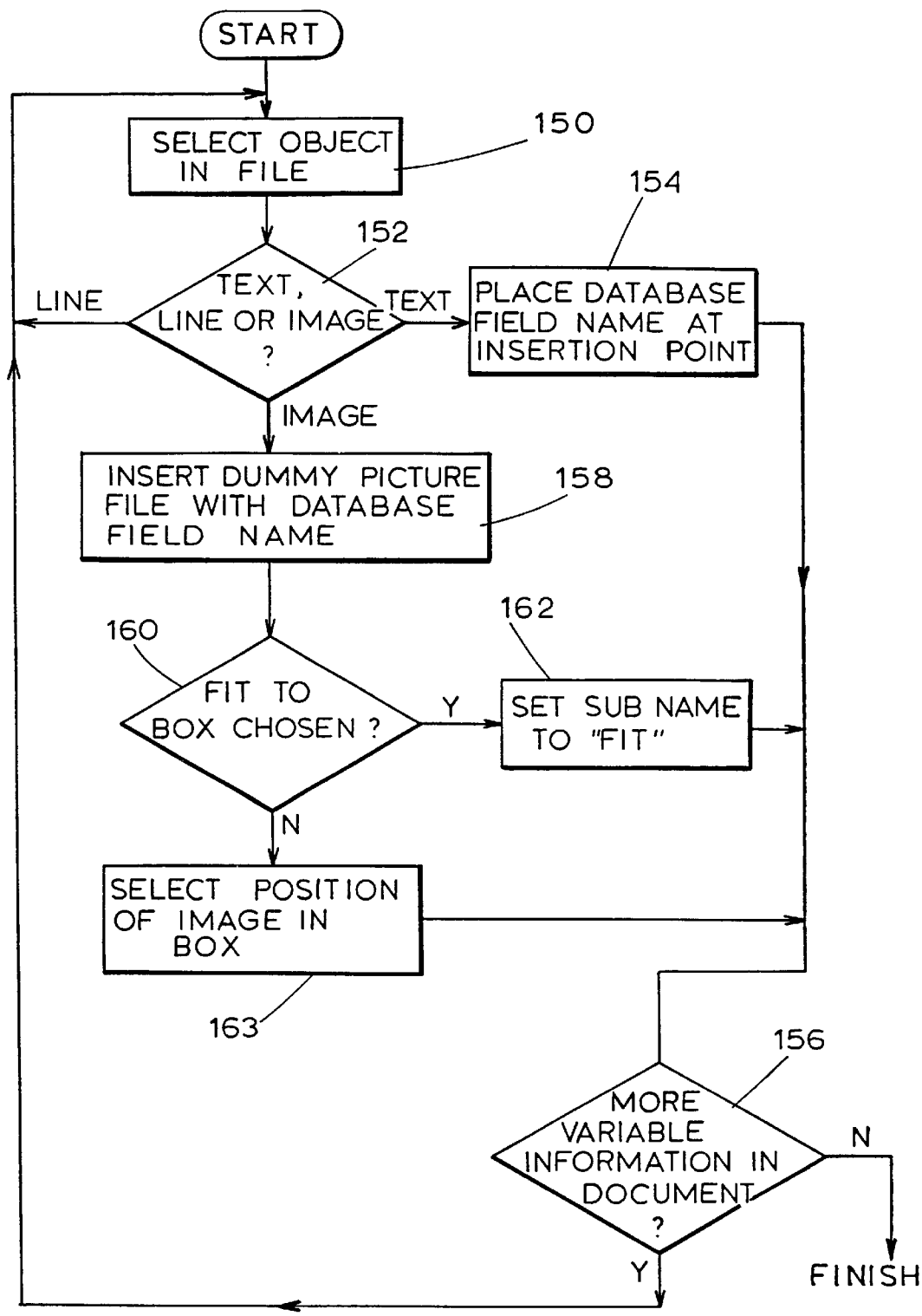
FIG. 9 is a flowchart illustrating programming that may be executed by a user on a personal computer to create the template files 105 of FIG. 5.

FIG. 9 illustrates a flow chart of programming executed by the personal computer 54 for creating the template file(s) 106 of FIG. 5. The programming may be written as an extension of Quark Xpress®, a page make-up program distributed by Quark, Inc. of Denver, Colorado. The Quark Xpress® program may be adapted for operation on the Apple® Macintosh® operating system or any other operating system, such as the Microsoft Windows® operating system. Alternatively, a different page make-up program may be used, if desired.

During the make-up process for a document consisting of one or more pages, a template file is created for each book version to be produced, or, where a book is to include two or more parts (referred to as "sections" hereinafter) a template file may be created for each section. At a block 150 a user may select an area of a page for reproduction of variable information therein, at which point a line object, a text object or an image object may be selected. A block 152 then checks to determine which type of object has been selected. If a text object has been selected, indicating that variable text is to be inserted at a point defined by the current cursor position on the computer display, the name of the appropriate field in the database 108 is inserted into the template file at the insertion point defined by the current cursor position. If the user wishes to designate more areas for variable information (block 156) control returns to the block 150 to await selection by the user. If the user then selects an image object, a box is defined by the user to contain an image at a desired location on a selected page. Control from the block 152 thereafter passes to a block 158 which inserts a dummy picture file and an indication of the proper database field name in the template file for the page at the location indicated by the current cursor position. The user will thereafter see the dummy picture file at the insertion point on the display of the computer 54 when the page is viewed. The dummy picture file will display an indication of which database field will be used for insertion on the respective pages.

Following the block 158, a block 160 prompts the user to enter an indication of whether the image object is to be displayed in one of two display formats. If the image is to be displayed in other than the original size thereof, a block 162 sets a subname defined for the image to "fit," indicating that the image is to be scaled to fit the box. If the image is to be displayed in the original size thereof, a block 163 prompts a user to select a position for the image at a particular location in the box defined therefore, such as the upper left-hand corner, the lower right-hand corner, or the like. If the user does not select a position, the image is placed in the upper left corner of the image box. Control thereafter proceeds to the block 156.

If the block 152 determines that a line object has been selected, control returns directly to the block 150, inasmuch as variable information cannot be entered into a line object.

At any point during the page make-up process, other functional aspects of the Quark Xpress® program may be invoked as necessary to produce finished pages.

Once the user determines that no more variable data is to be inserted into the document (block 156), the resulting page template files(s) are stored on a storage medium, such as an optical disc or other storage device, and/or the file(s) are downloaded together with the database to the control unit 52.

The database 108 is assembled by creating an ASCII file having a plurality of records wherein each record includes one or more fields entered into the database in tab-delimited format (i.e, the fields are separated from one another in each record by tab keystrokes and the records are separated from one another by line returns) and wherein the fields are arranged under field names of a header. Each field may include text to be reproduced on a page or a name of an image file stored in the memory 53 and defining an image to be reproduced on a page.

In addition to the foregoing data, the database 108 may include an optional field designating the number of copies of each book to be produced, an optional townsort image field, a version identification field indicating book version number if multiple book versions are to be produced, an optional distribution list field, control data and the like.

A sample database is set out below having a header consisting of twelve fields (i.e., "version," "addressline1," "addressline2," etc.) and a number of records, nine of which are shown, each having twelve fields:

| Version | Addressline1 | Addressline2 | Addressline3 | Addressline4 | Addressline5 | Price1 | Image1 | Price2 | Copies | Barcode | Townsort |
|---|---|---|---|---|---|---|---|---|---|---|---|
| 01 | William Doe | 123 Elm | Chicago | Illinois | 606248923 | $22.95 | Shoes | $21.95 | 1 | !606248923! | |
| 03 | Hugh Jorgensen | 56 Maple | Chicago | Illinois | 606248923 | $21.95 | Shirt | $20.95 | 1 | !606248923! | |
| 02 | Jay P. Morgan | 1313 Park | Chicago | Illinois | 606248924 | $24.95 | Pants | $22.95 | 1 | !606248924! | ■ |
| 02 | Joe Louis | 819 Elm | LaGrange | Illinois | 605251093 | $19.95 | Pants | $18.95 | 1 | !605251093! | |
| 03 | John Smith | 926 Cossit | LaGrange | Illinois | 605251093 | $19.95 | Shoes | $15.25 | 1 | !605251093! | |
| 01 | Len Johnson | 882 Monroe | LaGrange | Illinois | 605251093 | $19.95 | Shoes | $17.25 | 1 | !605251093! | |
| 02 | Janet Cizmar | 916 Monroe | LaGrange | Illinois | 605251094 | $24.95 | Pants | $21.95 | 1 | !605251094! | ■ |
| 03 | Jay Schroeder | 88 W. 77th | Brookfield | Illinois | 605241391 | $21.95 | Shirt | $19.95 | 1 | !605241391! | |
| 03 | John Doe | 129 Madison | Brookfield | Illinois | 605241391 | $22.95 | Shirt | $19.95 | 1 | !605241391! | ■ |

In the example of FIGS. 6a and 6b, the field names ADDRESSLINE1 through ADDRESSLINE5, BARCODE and TOWNSORT may appear in the area 112 and one or more of the field names PRICE1, IMAGE1 AND PRICE2 may appear in the area 110. Inasmuch as only a single version is to be produced in the example of FIGS. 6a and 6b, the VERSION field would not be used. The COPIES field may be used as a control code to select the number of book copies to be produced.

Figure 10C:
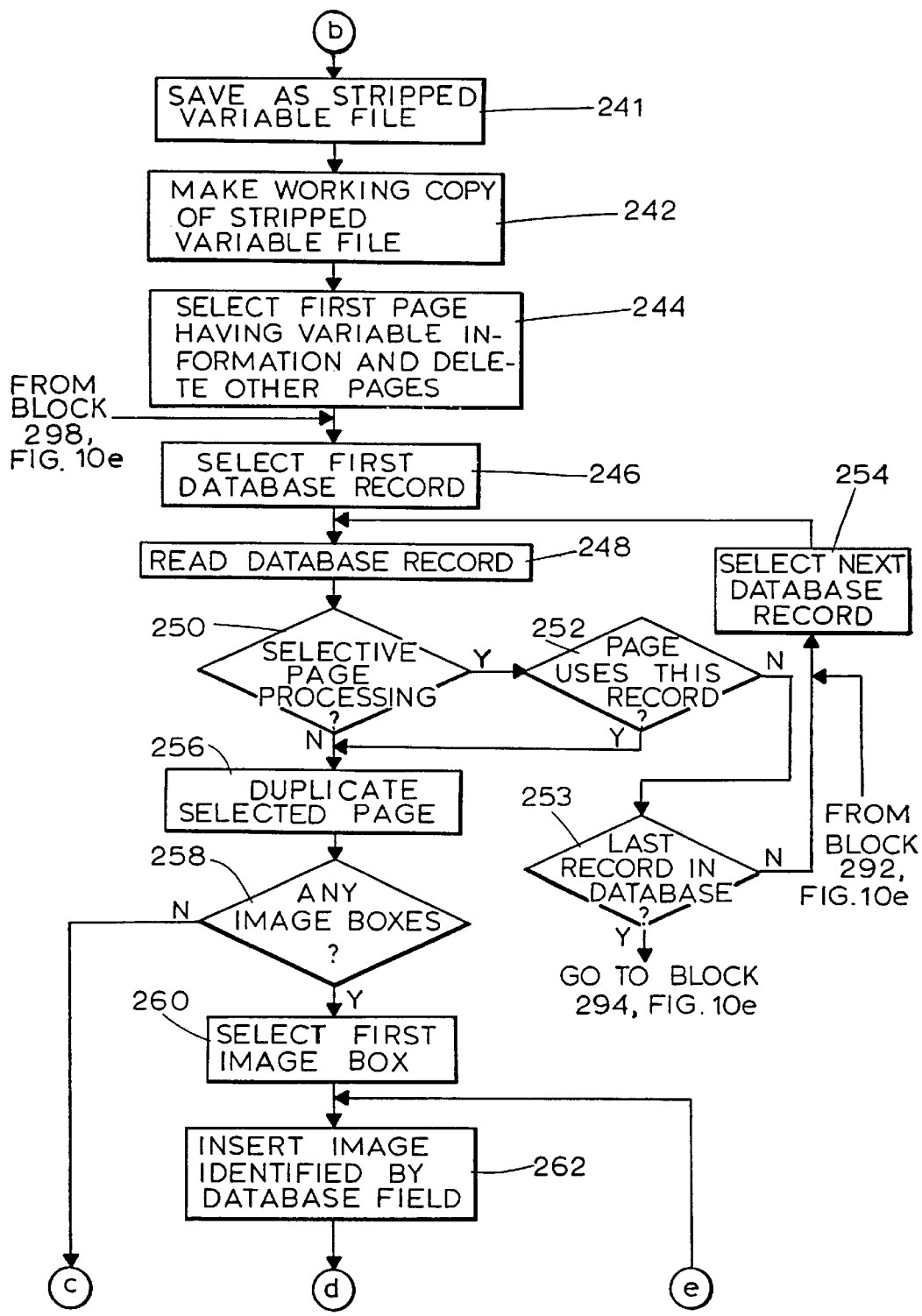
FIGS. 10a–10f, when joined along similarly-lettered lines, together represent programming executed by the control unit 52 of FIG. 3 to implement the present invention.
Figure 10D:
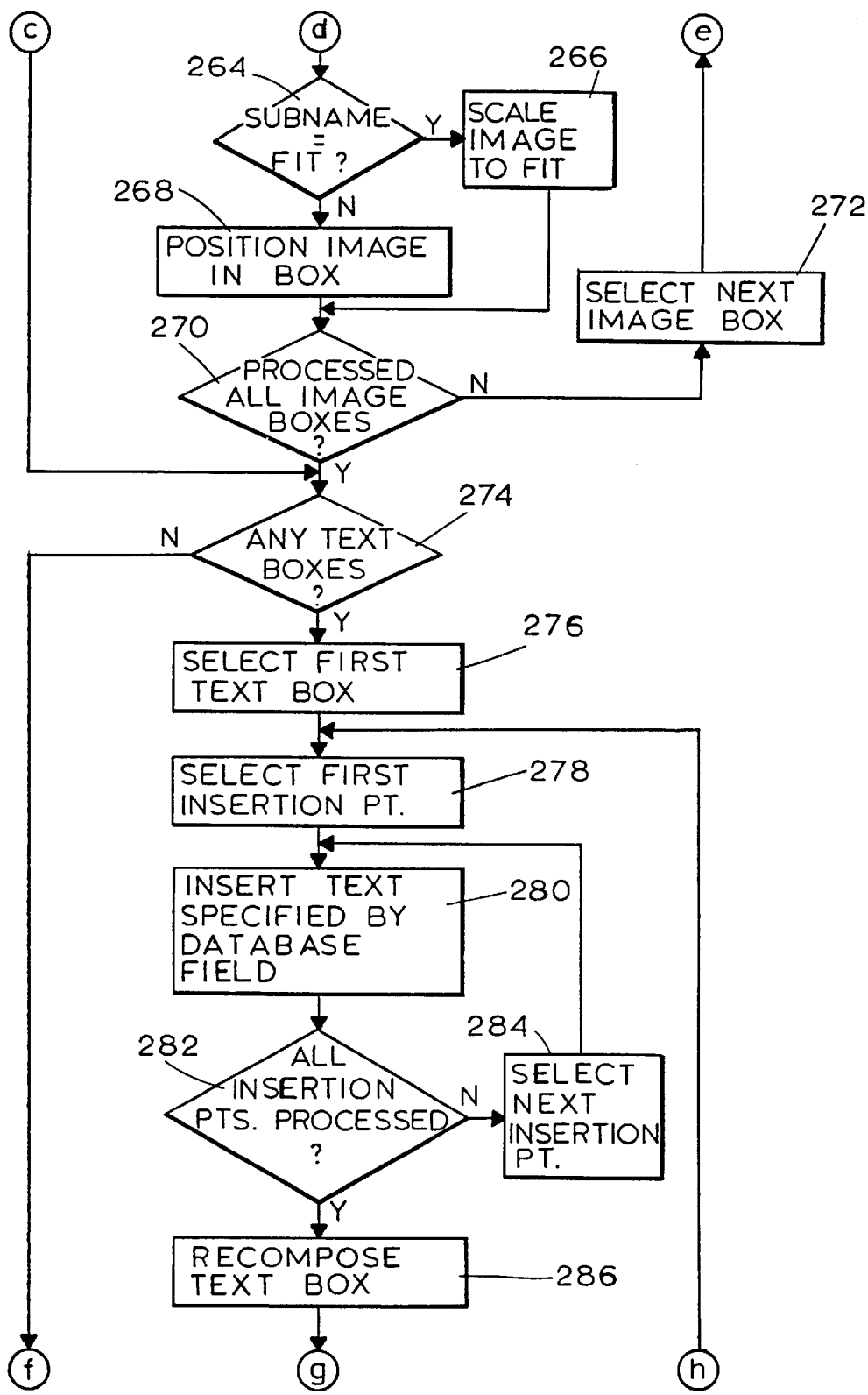
Figure 10E:
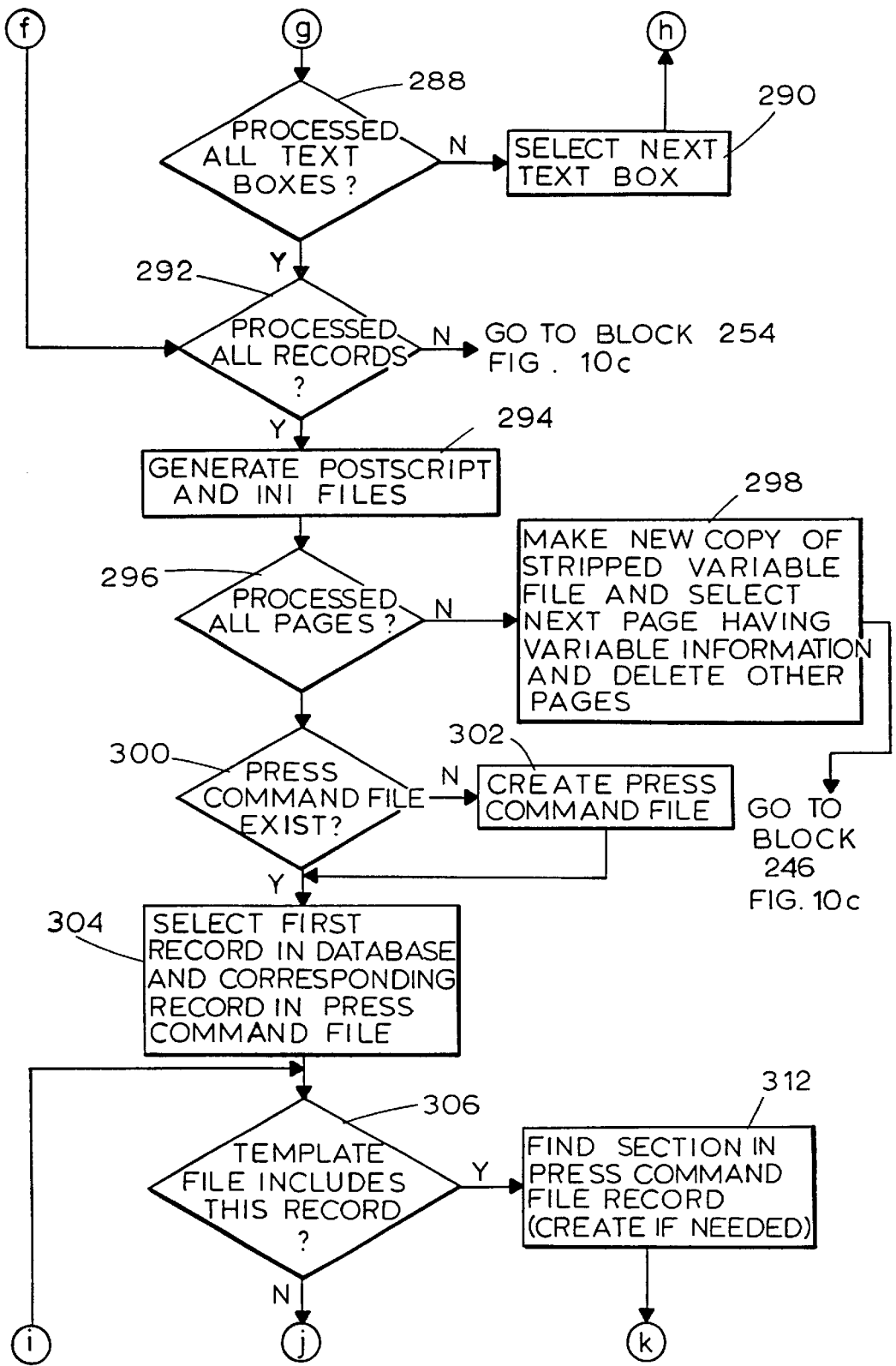
Figure 10:
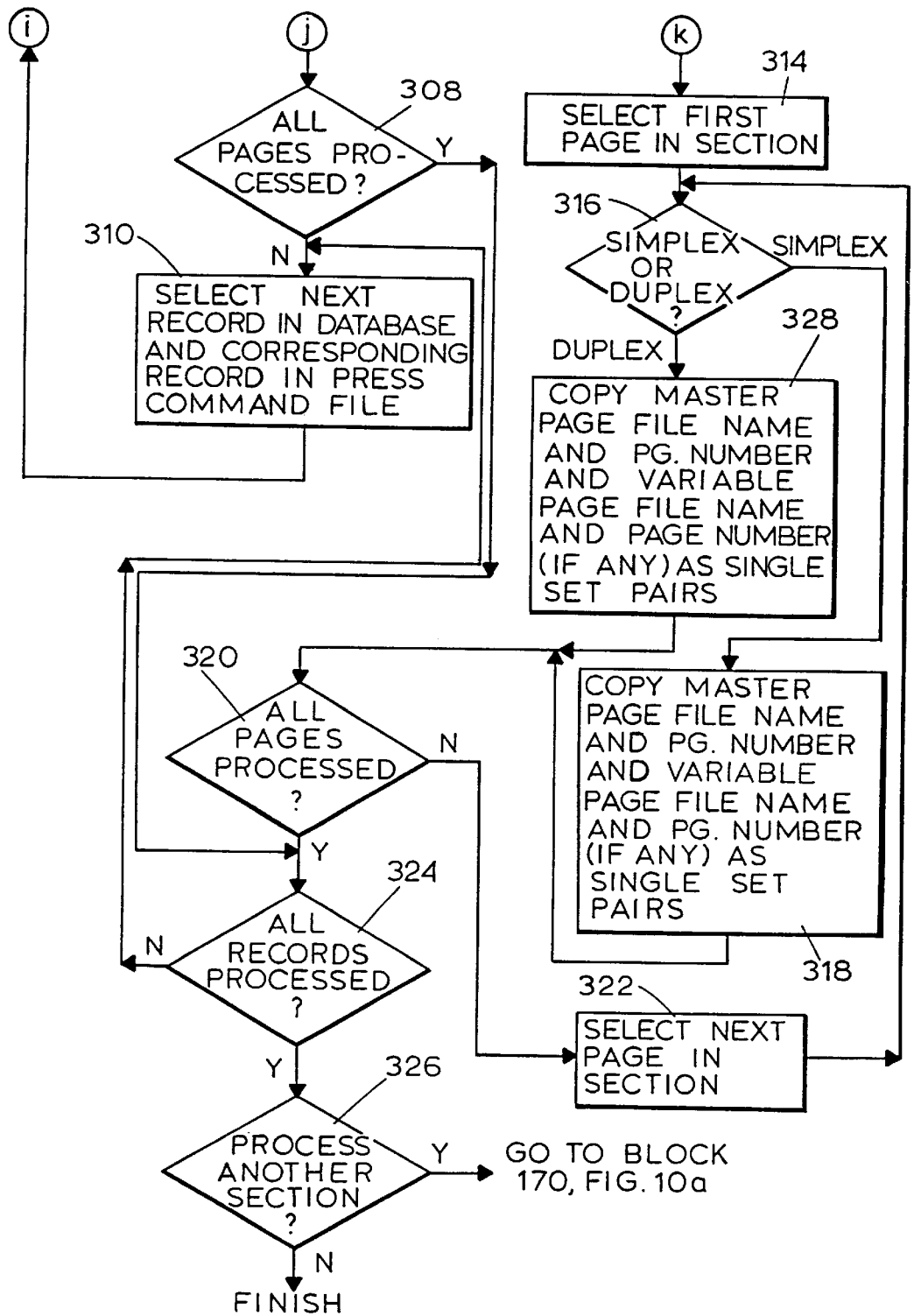

Once the template file(s) 106 and the database 108 are assembled, the programming of FIGS. 10a–10f may be executed by the control unit 52 to create the master page files 122 or 124, the final variable page files 137, 138 or 139, and the press command file 140. Referring first to FIG. 10a, a block 170 prompts a user to select a template file 106 and a block 172 opens the database 108. A block 174 then reads and stores in a list the database field names for later reference and a block 176 prompts a user to enter information indicating a section number and whether pages are to be printed in simplex (i.e., single-sided) or duplex (i.e., double-sided) format. The section number identifies the order in which multiple sections are to be processed for a particular book. The user may also be prompted to enter a selective processing code identifying a particular book version to process if multiple versions are to be produced during a single press run.

Following the block 176, a block 177 begins the process of stripping variable information from the template file opened by the block 170 to obtain the stripped master file 120 of FIG. 5. The block 177 selects a first page for processing and a block 178 checks to determine whether there are any images in the template file and, if images are located, a block 180 selects a first image. A block 182 identifies the file name for the image and a block 184 checks the field list to determine whether the file name is included therein. If the file name for the image is included in the field list, then the image comprises variable information and a block 186 deletes the image block. Otherwise, the block 186 is skipped and a block 188 checks to determine whether all images have been processed. If not, a block 190 selects a next image and control returns to the blocks 182–188. Control remains with such blocks until the block 188 determines that all images have been processed and control then passes to a block 192. Control also passes to the block 192 from the block 178 should the latter determine that there are no images in the template file.

The block 192 determines whether any text boxes are present in the open template file. If at least one text box is present, a block 194 selects and parses a first text box and a block 196 checks to determine whether the text box includes at least one of the field names of the database 108. If so, then it has been determined that the text box includes variable information and a block 198 deletes the text box. Otherwise, the block 198 is skipped and a block 200 checks to determine whether all text boxes in the template file have been processed. If not, a block 202 selects and parses the next text box in the template file and control returns to the blocks 196–200. Control remains with such blocks until all text boxes have been processed, whereupon a block 203 determines whether all pages have been processed. If not, a block 204 selects a next page and control returns to the block 178. Otherwise, a block 205 saves the resulting file as the stripped master file.

Control also bypasses the blocks 194–202 and proceeds directly from the block 192 to the block 203 if there are no text boxes in the open template file.

Following the block 205, a block 206, FIG. 10b, converts the stripped master file into the PDL master page file 122 of FIG. 5. At the same time, an initialization (or INI) file is created in ASCII code according to the following format:

| | |
|---|---|
| name: | [file path\name] |
| psx: | [dimension] |
| psy: | [dimension] |
| ssx: | [dimension] |
| ssy: | [dimension] |
| posx: | [dimension] |
| posy: | [dimension] |
| duplex: | [zero or one] |
| orientation: | [zero or one] |
| output: | [filename] |
| copies: | [number] |

Where "psx" and "psy" refer to finished page sizes in x and y directions, "ssx" and "ssy" refer to cut sheet size in x and y directions, "posx" and "posy" refer to offsets in x and y directions specifying placement of each page on a cut sheet, "duplex" refers to single or two-sided printing, "orientation" refers to portrait or landscape printing, "output" refers to the name of the output file and "copies" refers to the number of copies to be printed. A sample INI file which specifies parameters for printing of a file called MYJOB.PS is as follows:

| | |
|---|---|
| Name: | C:\jobs\myjob.ps |
| psx: | 8000 |
| psy: | 11000 |
| ssx: | 11500 |
| ssy: | 9000 |
| posx: | 150 |
| posy: | 150 |
| duplex: | 1 |
| orientation: | 1 |
| output: | myjob.ps |
| copies: | 1 |

In the foregoing example, one copy of the file MYJOB.PS is to be printed in duplex and portrait formats at an offset of 0.15×0.15 inches from a corner of a finished sheet of paper 8×11 inches cut from a sheet originally having dimensions of 9×11.5 inches.

Following the block 206, a block 208 then reopens the same template file originally opened by the block 170 to begin the process of creating the stripped variable page files 126 of FIG. 5. A block 209 selects a first page and a block 210 checks to determine whether there are any images in the file and, if so, a block 212 selects a first image for consideration. A block 214 identifies the file name for the image and if a block 216 determines that the file name is not in the field list, then the image comprises fixed information (i.e., image will be the same in all of the books of a given version) and hence the image box is deleted by a block 218.

On the other hand, if the file name for the image is in the database field list, then the image is of the variable type (i.e., the image changes with the books of a given book version), and hence a block 220 identifies and saves the image box location on the page, the characteristics of the image box, such as the size, skew, background color and subname and the like and further saves the field name of the image from the database 108. Also, a counter in the memory 53 which tracks the number of variable image boxes on the page is incremented.

Control from the blocks 218 and 220 passes to a block 222 which checks to determine whether all images have been processed. If not, a block 224 selects a next image and control returns to the blocks 214–222. Otherwise, control proceeds to a block 226 which begins the process of selecting and identifying text boxes. If there are text boxes present in the template file, a block 228 selects and parses a first text box and a block 230 checks the parsed text box to determine whether it includes one or more field names from the database. If not, then it has been determined that the text box includes only fixed information, and hence a block 232 deletes the text box. Otherwise, a block 234 stores the text box location, the insertion points in the text box at which variable information is to be printed and the characteristics of the text box and the field names of the database 108 identified in such text box in the memory 53. In addition, a variable text box counter is incremented representing the number of text boxes appearing on each page.

Control from the blocks 232 and 234 proceeds to a block 236 which checks to determine whether all text boxes have been processed. If not, a block 238 selects and parses the next text box and control returns to the blocks 230–236. Once all text boxes have been processed, or if the block 226 determines that there are no text boxes in the template file, a block 239 determines whether all pages have been processed and, if not, a block 240 selects the next page and control returns to the block 210. Otherwise, control passes to a block 241, FIG. 10c, which saves the resulting file as the stripped variable file 126 of FIG. 5.

Control also passes to the block 239 from the block 226 if there are no text boxes found.

A block 242 then creates a working copy of the stripped variable file 126 and a first page having variable data thereon is selected and data representing the remaining pages in the file are deleted by a block 244. A block 246 then deletes the data representing remaining pages in the file. In the example of FIGS. 6a and 6b, the block 244 creates a file defining the front page of a book with all fixed information deleted therefrom and an area reserved for variable information.

Following the block 244, a block 246 selects a first record in the database 108 and a block 248 reads the record. An optional block 250 checks to determine whether a selective processing code has been entered by the user indicating that the page is to undergo selective page processing. As noted above, the apparatus and method of the present invention may be utilized to produce not only books of a single version (i.e., where corresponding pages differ only in terms of the variable information stored in the database) but also books of different versions. In the latter case, the books of different versions have different fixed and variable information. The fixed and/or variable information may vary in terms of content or appearance (i.e., style, location, rotation, position, etc.) or both in different versions.

If the block 250 determines that selective page processing is to be undertaken, then a block 252 checks to determine whether the database record read by the block 248 is utilized on the page currently under consideration. If this is not the case, a block 253 checks to determine whether the record currently under consideration is the last in the database. If so, control slips to a block 294 of FIG. 10e. Otherwise, a block 254 selects a next record in the database 108 and control returns to the block 248 where the next database record is read.

If the block 250 determines that selective page processing is not to be undertaken, or if the block 252 determines that the record read by the block 248 is used in the page currently under consideration, a block 256 duplicates the data representing the page remaining after execution by the block 244 to initiate development of one of the files 130 or 132. In the first pass through the program of FIG. 10c, and in connection with the example of FIGS. 6a and 6b, the block 256 creates the file 130 and develops page data representing a first version of the page P1-a and adds further variable information to such page data during immediately succeeding passes through the program. Thereafter, data representing the remaining pages P1-b, P1-c and P4-a through P4-c are created and variable information is added to such pages serially during subsequent passes.

A block 258 checks to determine whether there are any image boxes on the page and, if so, a block 260 selects a first image box. A block 262 then inserts the image identified by the database field into the image box. A block 264, FIG. 10d, checks the subname to determine whether the block 162 of FIG. 9 has indicated that the image should be sized to fit the image box. If this is true, a block 266 performs the scaling. Otherwise, a block 268 positions the image in the image box at the position specified by the user and a block 270 checks to determine whether all image boxes have been processed. Control also passes from the block 266 directly to the block 270, thereby skipping the block 268. If not all image boxes have been processed, a block 272 selects a next image box on the page and control returns to the blocks 262–270 so that remaining image boxes are serially processed.

Once the block 270 determines that all image boxes have been processed, or immediately following the block 258 of FIG. 10c if no image boxes are found on the page, a block 274 checks to determine whether there are any text boxes on the page and, if so, a pair of blocks 276, 278 select a first text box and a first insertion point in such box. Blocks 280, 282 and 284 serially insert text data stored in the database 108 at the appropriate insertion points in the text box. Once all of the variable text data have been inserted into the text box, a block 286 recomposes all text in the text box so that the text obtains a neat finished appearance. The recomposition process is automatically undertaken by the Quark Xpress® program once the variable information is inserted into each text box. The recomposition process is responsive to the user commands as applied to the template file page, such as left, right, center, or full justification, hyphenation and the like. Following the block 286, a block 288, FIG. 10e, checks to determine whether there are remaining text boxes to be processed on the page and, if so, a block 290 selects the next text box on the page and control returns to the blocks 278–288 to insert text information into such text boxes.

Once the block 288 determines that all text boxes for the page have been processed, the programming required to produce one of the pages of the file 134 of FIG. 5 having variable information only thereon is complete. A block 292 then determines whether all records in the database have been considered for inclusion in additional variable pages of the file 134 to be produced. If not all records have been considered, control returns to the block 254, FIG. 10c, where the next database record is identified and read. On the other hand, if all pages of the file 134 have been produced by considering all records in the database 108, a block 294 converts the file data into PostScript® or another PDL format to create the variable page file 137 of FIG. 5. Also, an INI file is created as before, except that the "duplex" parameter is set to command simplex printing only. If necessary or desirable, should the press run length exceed a certain limit, the programming may be modified to create more than one variable page file for each variable page of the template file.

Following the block 294, a block 296 checks to determine whether there are other variable pages in the stripped variable page file to be processed. If this is true, a block 298 produces a new copy of the stripped variable file, selects the next variable page therein and deletes remaining pages therefrom. Control then returns to the block 246 of FIG. 10c. In the example of FIGS. 6a and 6b, the back page P4 and the corresponding pages of the remaining books are now selected for processing. In the fashion noted above, a file representing the variable portions of such pages is produced by developing the file representing the pages P4-*a* through P4-*c* and inserting the database information into such file to obtain the variable page file 136 and the PDL version 138.

Following generation of the variable page files 134, 136, and 137, 138 control passes to a block 300 which checks to determine whether a press command file has already been created. If not, a file is created by a block 302 having placeholder comments indicating where in the press command file individual press commands are to be placed for each book to be produced. The press command file may also include data from one or more fields of the database 108 identifying an intended recipient of each book to be produced to assist in reproducing books found to be defective or to produce sample books. At this point, the press command file for the example of FIGS. 6*a* and 6*b* may be as follows (using data from the sample database set out above):

;RECORD1
;WILLIAM DOE:606248923
;ENDRECORD
;RECORD2
;HUGH JORGENSEN:606248923
;END RECORD
;RECORD3
;JAY P. MORGAN:606248924
;END RECORD

Following the block 300 (if the press command file already exists) or the block 302 a block 304 selects the first database record and a corresponding first record in the press command file. A block 306 then checks to determine whether the template file currently being processed includes the selected database record. If not, a block 308 determines whether all pages have been processed, and if this is not the case, the next record in the database 108 and a corresponding record in the press command file are selected. Control then returns to the block 306. If the block 306 ascertains that the template file includes the selected record, a block 312 inserts an indication of the section number in the press command file at an appropriate point if the section number is not already present. If the section number is present already, the press command identified by the section number entered by the user at the block 176 is identified to be overwritten at a later point. The press command file now appears as follows for the example of FIGS. 6*a* and 6*b*:

;RECORD1
;WILLIAM DOE:606248923
;SECTION 1
;ENDSECTION
;ENDRECORD
;RECORD2
;HUGH JORGENSEN:6062488923
;SECTION 1
;ENDSECTION
;END RECORD
;RECORD3
;JAY P. MORGAN:606248924
;SECTION 1
;END SECTION
;END RECORD

Following the block 312, a block 314, FIG. 10*f*, selects a first page of the section and a block 316 checks the state of a flag stored in the memory 53 to determine whether a simplex or duplex job has been requested. If a simplex job has been requested, the file name and page number of the master page file and, if variable information is to appear on the page, the file name and page number of the variable page file for the selected page are stored as a single set pair in the memory 53 by a block 318. The determination of whether variable information is to appear on the selected page is accomplished by summing the contents of the variable image box counter and the variable text box counter as incremented by the blocks 220 and 234 of FIG. 10*b*.

A block 320 checks to determine whether all pages have been processed and, if not, the next page is selected by a block 322 and control returns to the block 316 for processing of such page. If all pages have been processed, control passes to a block 324 which determines whether all database and press command records have been processed. Control also passes to the block 324 if the block 308 determines that all pages have been processed. If not all records have been processed at this point, control returns to the block 310 where the next records in the database and press command file are selected.

If the block 324 determines that all records for the current section have been processed, a block 326 determines whether another section is to be processed and, if so, control returns to the block 170 of FIG. 10*a*. If there is not another section to be processed, the press command file has been fully assembled, and hence the process terminates.

If the block 316 determines that a duplex job is to be effected, control passes to a block 328 which stores in the memory 53 a command identifying the file names and page numbers of the master page file (as well as corresponding information relative to variable page files, if variable information is to appear) as two-set pairs. Control from the block 328 then passes to the block 320 described above.

The result of the programming of FIGS. 10*a*–10*f* is a press command file having a sequence of press commands which cause printing of pages in a desired order. In the example of FIGS. 6*a* and 6*b*, the press command file would read as follows:

BOOK A
;RECORD1
;WILLIAM DOE:606248923
;SECTION 1
"file.m"1@"file.1"1|"file.m"2
"file.m"3|"file.m"4@"file.4"1
;ENDSECTION
;ENDRECORD
;RECORD2
;HUGH JORGENSEN:606248923
;SECTION 1
"file.m"1@"file.1"2|"file.m"2
"file.m"3|"file.m"4@"file.4"2
;ENDSECTION
;ENDRECORD
;RECORD3
;JAY P. MORGAN:606248924
;SECTION 1
"file.m"1@"file.1"3|"file.m"2
"file.m"3|"file.m"4@"file.4"3
;ENDSECTION
;ENDRECORD
ENDBOOK
PRINTRUN R
BOOK A
ENDPRINTRUN In the foregoing example, "file.m" is a file name identifying the master page file 122 and "file.1" and "file.4" are file names identifying the variable page files 137 and 138, respectively. The number following each file name designates a particular page of the file identified by the file name. Thus, for example, "file.m" 1 designates the first page of the master file "file.m" and "file.1" 2 designates the second page of the variable page file "file.1." The @ sign means to associate the pages of the files linked by such sign and the vertical line in the commands indicates that the page(s) on the left side of the vertical line are to be printed on the front side of a piece of paper whereas the page(s) on the right side of the vertical line are to be printed on the reverse side of the piece of paper. In an example of simplex printing, no file name would appear to the right of the vertical line in each command.

Figure 11A:
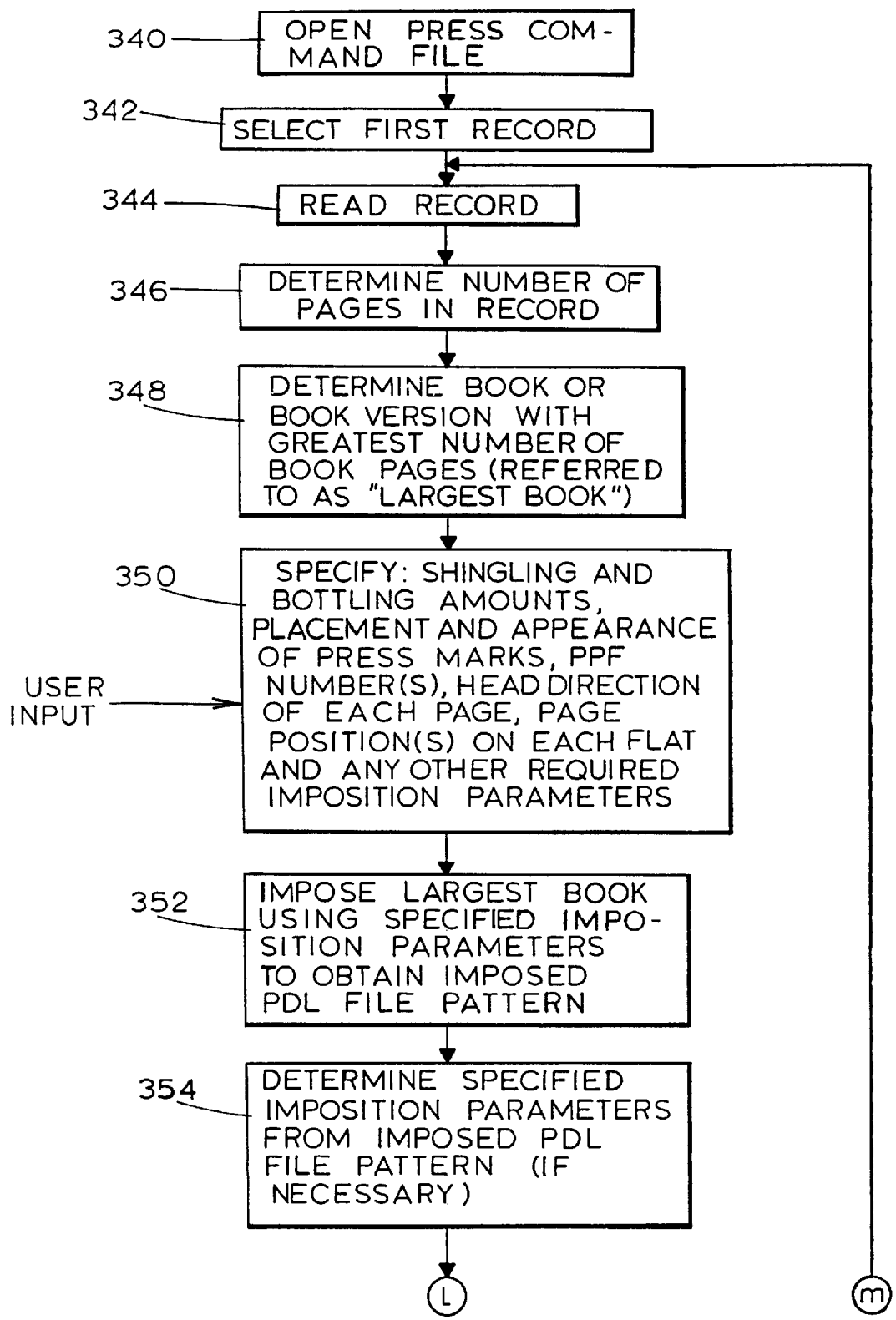
FIGS. 11a–11c, when joined along the similarly-lettered lines, together represent programming executed by the control unit 52 of FIG. 3 to impose pages to be printed by one of the demand printing systems of FIG. 3.
Figure 11B:
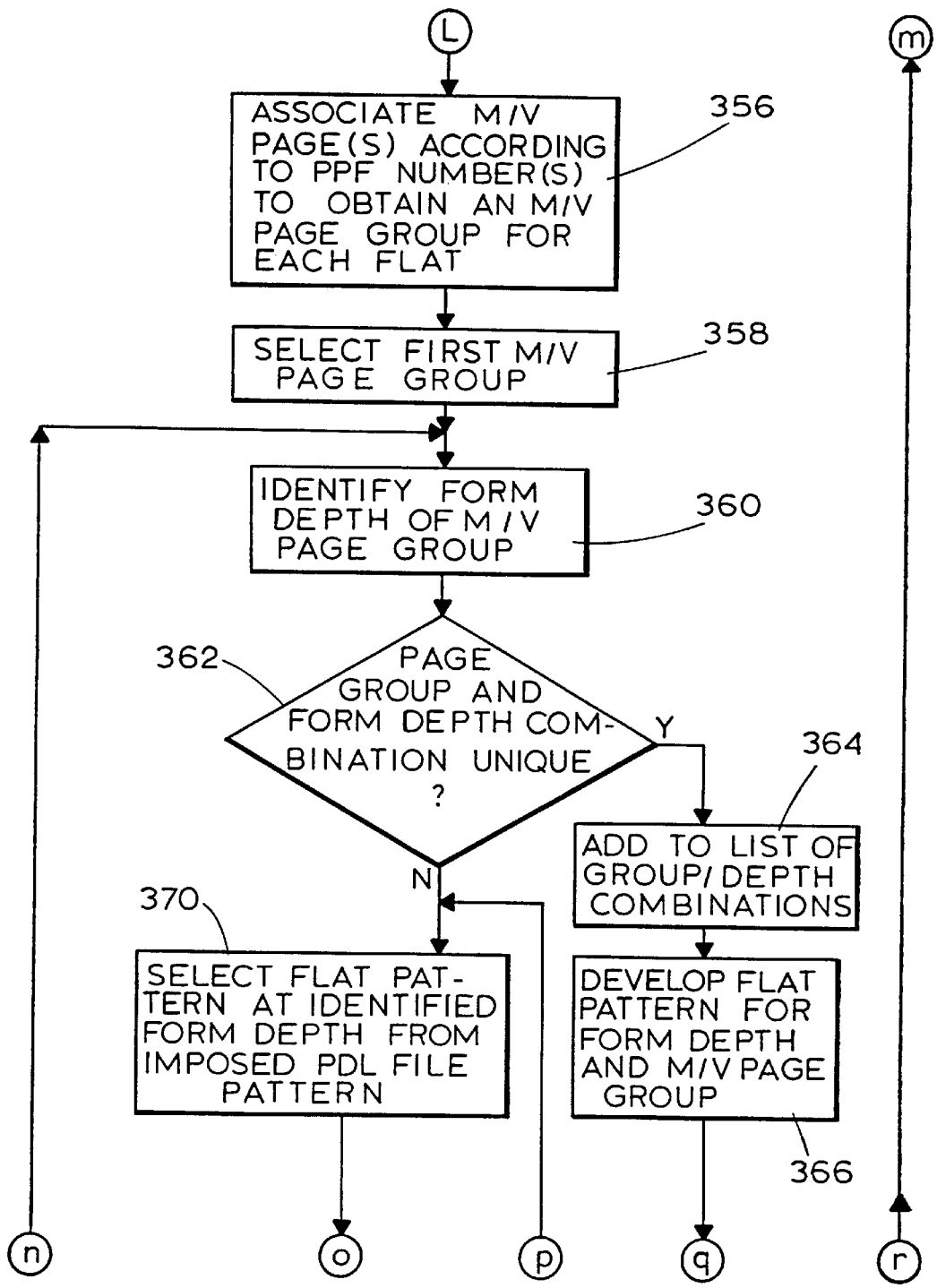
Figure 11C:
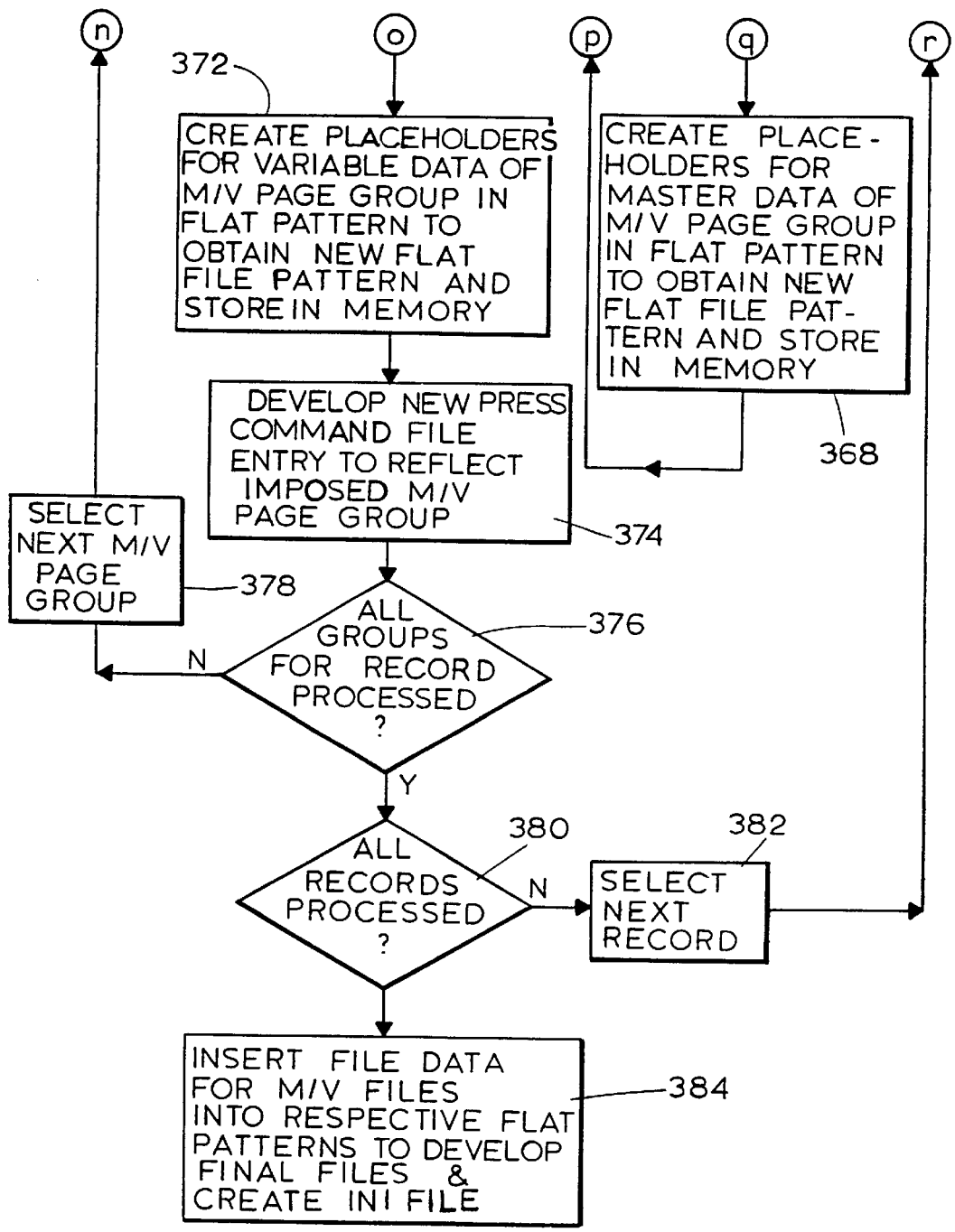

FIGS. 11*a*–11*c* illustrate an exemplary imposition system which may be used to impose pages for printing. The imposition system of FIGS. 11*a*–11*c* is invoked to create a new press command file which prints at least one, and likely two or more pages on one or both sides of a form. The programming begins at blocks 340 and 342 which open the press command file and select a first record therein. A block 344 then reads such record and a block 346 determines the number of master pages that are in the press command file record read by the block 344. In the example shown in FIGS. 6*a* and 6*b*, and as defined in the press command file example set forth above, each book includes four master pages. The block 346 determines the number of master pages in the record to determine page assignments to the various forms. As noted above, "form" designates a single sheet of paper as printed by the press. Each form has two sides, each of which is referred to as a "flat." Each flat includes a number of pages thereon, wherein the number is hereinafter referred to as the "PPF" number (for "pages-per-flat" number).

A block 348 determines the book or the book version to be produced during the print job having the greatest number of book pages. This book or book version is hereinafter referred to as the "largest book". A block 350 then prompts a user to enter various imposition parameters including shingling and bottling amounts, placement and appearance of press marks, head direction of each page (when not all pages have the same head direction, for example, as seen in FIGS. 8*a* and 8*b*) page position(s) on each flat and any other required imposition parameters. In addition, the user is prompted to enter the PPF number for each flat type to be produced. For example, the user may be prompted to enter a PPF number of two for the examples of FIGS. 6*a*, 6*b* and 7*a*, 7*b* and a PPF number of four for the example of FIGS. 8*a* and 8*b*. The parameters may be specified by a user using any commercially available and suitable imposition system such as Preps®, by ScenicSoft, Inc. of Everett, Washington, Impostrip®, by Ultimate Technographics of Montreal, Quebec, Canada, Quark Inposition® by Quark, Inc. of Denver, Colorado, or any other system. Alternatively, the imposition system disclosed in Sands et al. U.S. Pat. Ser. No. 738,217, filed Jul. 30, 1991, and entitled "Digital Page Imaging System" can be used.

Following the block 350 a block 352 develops an imposition pattern allowing a block 354 to derive the specified imposition patterns. This step effected by the block 352 is necessary inasmuch as the specified imposition parameters are not directly available to such programming, and hence the parameters must be obtained by selecting the largest book or book version to be produced and imposing same so that the imposition parameters can be deduced therefrom. If the imposition parameters can be provided to the programming of FIGS. 11*b* and 11*c* directly, then the blocks 352 and 354 would be unnecessary and may be omitted.

Following the block 354, a block 356, FIG. 11*b*, associates master and variable pages to appear on the same flat with each other according to the PPF number for such flat to obtain a master/variable page group for each flat. In the example of FIG. 6*a*, the master and variable files for the pages P1 and P4 would be associated together. In the example of FIG. 8*a*, the master and variable files for the pages P9, P12, P13 and P16 would be associated by the block 356.

A block 358 then selects a first master/variable page group and a block 360 determines the form depth of the master/variable page group. The "form depth" is the position of a printed flat in a stack of forms which are stitched together to produce a book.

Following the block 360, a block 362 checks to determine whether the form depth and the identity of the master/variable page group are a unique combination. If so, a block 364 creates a list in the memory 53 of group/depth combination (if such list has not already been created) and adds the current group and form depth combination to such list.

Following the block 364, a block 366 develops and saves a flat pattern defining a template for the master/variable page group, taking into account the form depth of such group. The flat pattern is a file defining the positions of the pages associated as a group by the block 356. A block 368 then creates placeholders for the master data of the master/variable page group in the flat pattern so that a new flat file pattern is obtained. The new flat file pattern is stored in the memory 53 and control passes to a block 370, FIG. 11*b*. Control also passes directly to the block 370 from the block 362, bypassing the blocks 364–368, if the page group identity and form depth combination is not unique.

The block 370 identifies and selects the flat pattern from the imposed PDL file pattern developed by the block 352 at the form depth of the selected master/variable page group. A block 372, FIG. 11*c*, then creates place holders for variable data of the master/variable page group in the flat patterns selected by the block 370 to obtain a new flat pattern which is then stored in the memory 53. A block 374 thereafter develops a new press command file entry to reflect the imposed master/variable page group.

Following the block 374, a block 376 checks to determine whether all master/variable groups for the record of the press command file currently under consideration have been processed. If not, a block 378 selects the next master/variable page group and control returns to the block 360 of FIG. 11*b*. Otherwise, a block 380 checks to determine whether all records in the press command file have been processed. If not, a block 382 selects the next record and control returns to the block 344 of FIG. 11*a*. If all records have been processed, a block 384 inserts the file data for the master/variable files into the placeholders in the respective flat patterns to develop the imposed master and variable page files 124 and 139 of FIG. 5. A suitable INI file is also created to reflect the new flat geometry.

Figure 12:
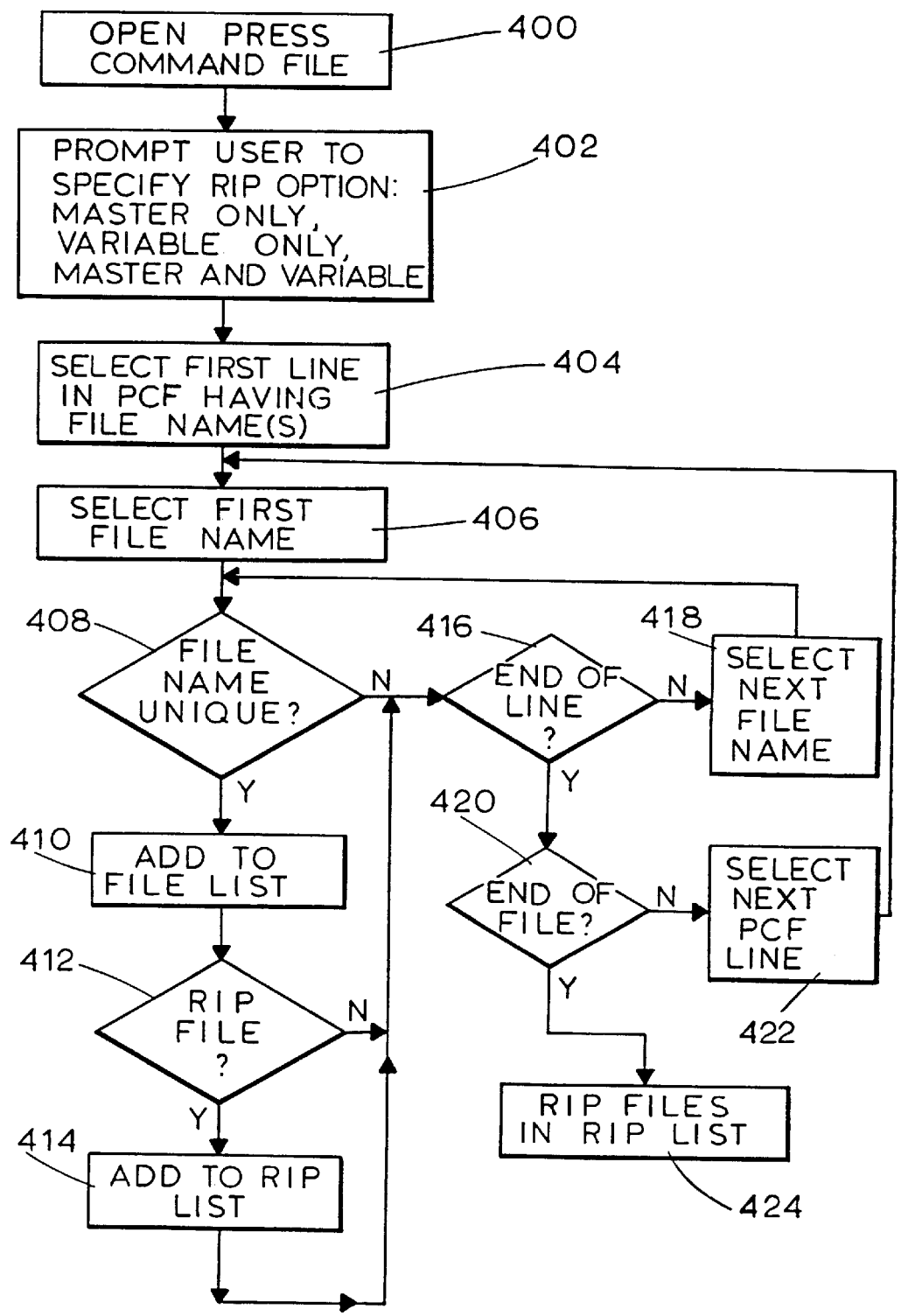
FIG. 12 illustrates programming executed by the control unit of 52 of FIG. 3 to convert page files into bitmap format.

FIG. 12 illustrates programming which may be executed by the control unit 52 of FIG. 3 to facilitate conversion of the imposed page files 124 and 139 into bitmap format using the RIP 82 of FIG. 4. The programming begins at a block 400 which opens the press command file stored in the memory 53. A block 402 then prompts a user to specify options which are available using the RIP 82. The options include the ability to convert only master page files, only variable page files or both master and variable page files into bitmap format. A block 404 then selects the first line in the press command file having at least one file name therein. Thereafter, a block 406 selects a first file name and a block 408 checks a file list stored in the memory 53 to see if the file name has been previously placed in the list. If this is not the case, then this is the first time the file name has been encountered in the programming of FIG. 12. Thus, a block 410 adds the file name to the file list and a block 412 checks the user-specified options set by the block 402 to determine whether the file should be converted into bitmap format. If so, a RIP list stored in the memory 53 is updated by adding the file name thereto and control passes to a block 416. Control also passes to the block 416 from the block 412 bypassing the block 414 if the file is not to be converted into bitmap format, and from the block 408 if the file name currently under consideration is already in the file list.

The block 416 checks to determine whether the end of the current line in the press command file has been reached. If not, a block 418 selects the next file name in the line and control returns to the block 408.

If the block 416 determines that the end of the current line in the press command file has been reached, a block 420 checks to determine whether the end of the press command file has been reached. If not, a block 422 selects the next line in the press command file having at least one file name and control returns to the block 406. On the other hand, if the end of the file has been reached, a block 424 causes the RIP 82 to convert the files identified in the RIP list into bitmap format by issuing commands and files as appropriate to the RIP 82.

The programming of FIG. 12 facilitates conversion of files to bitmap format as required by the print system 79.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A method of developing a data file representative of a page from a template file and a database file, wherein the template file includes data representing fixed information to be reproduced on the page and data representing a position for variable information on the page and wherein the database includes data representing variable information to be reproduced at the position on the page, the method comprising the steps of:

developing a first data file from the template file, wherein the first data file includes the data representing the fixed information;

developing a second data file from the template file, wherein the second data file includes the data representing the position for the variable information on the page;

developing a third data file from the second data file and the data in the database; and developing a fourth data file that specifies a manner of combining the first and third data files to produce the data file representative of the page.

2. The method of claim 1, wherein each of the developing step is undertaken using a desktop publishing application.

3. The method of claim 1, wherein the step of developing the first data file includes the steps of opening a working copy of the template file and stripping the data representing the position for the variable information therefrom.

4. The method of claim 3, wherein the step of stripping includes the steps of comparing the data in the template file with the data in the database and, based on the comparison, removing only the variable information from the working copy of the template file.

5. The method of claim 4, wherein the step of comparing includes the steps of identifying images within the template file, wherein each image has a name, and deleting any image having a name corresponding to a field name of the database from the working copy of the template file.

6. The method of claim 4, wherein the step of comparing includes the steps of identifying text boxes within the template file, wherein each text box includes a word, and deleting the any text box having a word corresponding to a field name of the database from the working copy of the template file.

7. The method of claim 1, wherein the step of developing the second data file includes the steps of opening a working copy of the template file and stripping the data representing the fixed information therefrom.

8. The method of claim 7, wherein the step of stripping includes the steps of comparing the data in the template file with the data in the database and, based on the comparison, removing only the fixed information from the working copy of the template file.

9. The method of claim 8, wherein the step of comparing includes the steps of identifying images within the template file, wherein each image has a name, and deleting any image having a name that does not correspond to a field name of the database from the working copy of the template file.

10. The method of claim 8, wherein the step of comparing includes the steps of identifying text boxes within the template file, wherein each text box includes a word, and deleting any text box that does not have a word corresponding to a field name of the database from the working copy of the template file.

11. The method of claim 1, wherein the step of developing the second data file includes the step of storing data representing attributes of the variable information in the second data file.

12. The method of claim 11, wherein the step of developing the third data file includes the steps of extracting the data representing variable information from the database, formatting the extracted data using the data representing attributes, and inserting the formatted data into the second data file in place of the data representing the position for variable information.

13. A system that develops a data file representative of a page from a template file and a database file, wherein the template file includes data representing fixed information to be reproduced on the page and data representing a position for variable information on the page and wherein the database includes data representing variable information to be reproduced at the position on the page, the system comprising:

a computer readable medium;

a first routine stored on the computer readable medium and adapted to be executed by a processor that develops a first data file from the template file, wherein the first data file includes the data representing the fixed information;

a second routine stored on the computer readable medium and adapted to be executed by the processor that develops a second data file from the template file, wherein the second data file includes the data representing the position for the variable information on the page;

a third routine stored on the computer readable medium and adapted to be executed by the processor that develops a third data file from the second data file and the data in the database; and a fourth routine stored on the computer readable medium and adapted to be executed by the processor that develops a fourth data file that specifies a manner of combining the first and third data files to produce the data file representative of the page.

14. The system of claim 13, wherein each of the first through fourth routines are performed using a desktop publishing application.

15. The system of claim 13, wherein the first routine is further adapted to open a working copy of the template file and strip the data representing the position for the variable information therefrom.

16. The system of claim 15, wherein the first routine is further adapted to compare the data in the template file with the data in the database and, based on the comparison, remove only the variable information from the working copy of the template file.

17. The system of claim 16, wherein the first routine is further adapted to identify images within the template file, wherein each image has name, and delete the any image having a name corresponding to a field name of the database from the working copy of the template file.

18. The system of claim 16, wherein the first routine is further adapted to identify text boxes within the template file, wherein each text box has a word, and delete any text box having a word corresponding to a field name of the database from the working copy of the template file.

19. The system of claim 13, wherein the second routine is further adapted to open a working copy of the template file and strip the data representing the fixed information therefrom.

20. The system of claim 19, wherein the second routine is further adapted to compare the data in the template file with the data in the database and, based on the comparison, remove only the fixed information from the working copy of the template file.

21. The system of claim 20, wherein the second routine is further adapted to identify images within the template file, wherein each image has a name, and delete any image having a name that does not correspond to a field name of the database from the working copy of the template file.

22. The system of claim 20, wherein the second routine is further adapted to identify text boxes within the template file, wherein each text box includes a word, and delete any text box that does not have a word corresponding to a field of the database from the working copy of the template file.

23. The system of claim 13, second routine is further adapted to store data representing attributes of the variable information in the second data file.

24. The system of claim 23, wherein the third routine is further adapted to extract the data representing variable information from the database, format the extracted data using the data representing attributes, and insert the formatted data into the second data file in place of the data representing the position for variable information.

25. A system for developing a data file representative of a page from a template file and a database file, wherein the template file includes data representing fixed information to be reproduced on the page and data representing a position for variable information on the page and wherein the database includes data representing variable information to be reproduced at the position on the page, the system comprising:

a control unit having a memory and a processor, wherein the control unit:

develops a first data file from the template file wherein the first data file includes the data representing the fixed information;

develops a second data file from the template file wherein the second data file includes the data representing the position for the variable information on the page;

develops a third data file from the second data file and the data in the database; and develops a fourth data file that specifies a manner of combining the first and third data files to produce the data file representative of the page.

26. The system of claim 25, wherein the control unit develops the first through fourth data files using a desktop publishing application.

27. The system of claim 25, wherein the control unit develops the first data file by opening a working copy of the template file and stripping the data representing the position for the variable information therefrom.

28. The system of claim 27, wherein control unit strips the data representing the position for the variable information by comparing the data in the template file with the data in the database and, based on the comparison, removing only the variable information from the working copy of the template file.

29. The system of claim 28, wherein the control unit compares the data representing the position for the variable information by identifying images within the template file, wherein each image has a name, and deleting any image having a name corresponding to a field name of the database from the working copy of the template file.

30. The system of claim 28, wherein the control unit compares the data representing the position for the variable information by identifying text boxes within the template file, wherein each text box includes a word, and deleting any text box having a word corresponding to a field name of the database from the working copy of the template file.

31. The system of claim 25, wherein the control unit develops the second data file by opening a working copy of the template file and stripping the data representing the fixed information therefrom.

32. The system of claim 31, wherein the control unit strips the data representing the fixed information by comparing the data in the template file with the data in the database and, based on the comparison, removing only the fixed information from the working copy of the template file.

33. The system of claim 32, wherein the control unit compares the data in the template file with the data in the database by identifying images within the template file, wherein each image has name, and deleting any image that does not have a name corresponding to a field name of the database from the working copy of the template file.

34. The method of claim 32, wherein the wherein the control unit compares the data in the template file with the data in the database by identifying text boxes within the template file, wherein each text box includes a word, and deleting any text box that does not have a word corresponding to a field name of the database from the working copy of the template file.

35. The system of claim 25, wherein the control unit stores data representing attributes of the variable information in the second data file.

36. The system of claim 35, wherein the control unit develops the third data file by extracting the data representing variable information from the database, formatting the extracted data using the data representing attributes, and inserting the formatted data into the second data file in place of the data representing the position for variable information.

* * * * *